(12) United States Patent
Shapiro et al.

(10) Patent No.: US 12,592,061 B2
(45) Date of Patent: Mar. 31, 2026

(54) COMPUTER-IMPLEMENTED METHOD FOR GENERATING (TRAINING) IMAGES

(71) Applicant: Robert Bosch GmbH, Stuttgart (DE)

(72) Inventors: Yoel Shapiro, Kiryat Bialik (IL); Yuri Feldman, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 278 days.

(21) Appl. No.: 18/463,559

(22) Filed: Sep. 8, 2023

(65) Prior Publication Data

US 2024/0096069 A1 Mar. 21, 2024

(30) Foreign Application Priority Data

Sep. 16, 2022 (EP) ...................................... 22196199

(51) Int. Cl.
*G06V 10/774* (2022.01)
*B25J 9/16* (2006.01)
(Continued)

(52) U.S. Cl.
CPC .......... *G06V 10/774* (2022.01); *B25J 9/1664* (2013.01); *G06T 7/12* (2017.01); *G06T 7/50* (2017.01);
(Continued)

(58) Field of Classification Search
None
See application file for complete search history.

(56) References Cited

U.S. PATENT DOCUMENTS

| | | | | |
|---|---|---|---|---|
| 11,508,077 | B2 * | 11/2022 | Kim | ........................... G06T 7/70 |
| 2021/0374453 | A1 * | 12/2021 | Kuo | ................... G06V 10/7715 |

(Continued)

FOREIGN PATENT DOCUMENTS

WO 2020195416 A1 10/2020

OTHER PUBLICATIONS

Xie C, Xiang Y, Mousavian A, Fox D. The best of both modes: Separately leveraging rgb and depth for unseen object instance segmentation. InConference on robot learning May 12, 2020 (pp. 1369-1378). PMLR. (Year: 2020).*

(Continued)

*Primary Examiner* — Michelle M Entezari Hausmann
(74) *Attorney, Agent, or Firm* — NORTON ROSE FULBRIGHT US LLP

(57) ABSTRACT

A computer-implemented method for generating labelled training images characterizing manipulation of a plurality of stackable objects in a workspace. The method includes: obtaining a first training image subset obtained at a first time index comprising a depth map and a visual image of a plurality of stackable objects in a stacking region of a workspace; obtaining a second training image subset obtained at a second time index comprising a depth map and a visual image of the stacking region in the workspace, wherein the second training image subset characterizes a changed spatial state of the stacking region; computing a depth difference mask based on the depth maps; computing a visual difference mask based on the visual images of the first and second training image subsets; generating an annotated segmentation mask using the depth difference mask and/or the visual difference mask.

14 Claims, 14 Drawing Sheets

(51) Int. Cl.

| | |
|---|---|
| *G06T 7/12* | (2017.01) |
| *G06T 7/50* | (2017.01) |
| *G06V 10/74* | (2022.01) |
| *G06V 20/70* | (2022.01) |

(52) U.S. Cl.
CPC ............ *G06V 10/761* (2022.01); *G06V 20/70* (2022.01); *G06V 2201/07* (2022.01)

(56) References Cited

U.S. PATENT DOCUMENTS

| | | | |
|---|---|---|---|
| 2022/0230216 A1* | 7/2022 | Buibas .................... | G06Q 30/02 |
| 2022/0375210 A1* | 11/2022 | Ngo ........................ | G06V 20/52 |
| 2024/0169542 A1* | 5/2024 | Borse ...................... | G06V 10/44 |
| 2024/0303833 A1* | 9/2024 | Boardman .............. | G06T 7/344 |

OTHER PUBLICATIONS

Yun J, Jiang D, Sun Y, Huang L, Tao B, Jiang G, Kong J, Weng Y, Li G, Fang Z. Grasping pose detection for loose stacked object based on convolutional neural network with multiple self-powered sensors information. IEEE Sensors Journal. Aug. 1, 2022;23(18): 20619-32. (Year: 2022).*

Van Tran L, Lin HY. BiLuNetICP: A deep neural network for object semantic segmentation and 6D pose recognition. IEEE Sensors Journal. Nov. 3, 2020;21(10):11748-57. (Year: 2020).*

Xiang Y, Schmidt T, Narayanan V, Fox D. Posecnn: A convolutional neural network for 6d object pose estimation in cluttered scenes. arXiv preprint arXiv:1711.00199. Nov. 1, 2017. (Year: 2017).*

Tian H, Song K, Tong L, Man Y, Yan Y. Robot unknown objects instance segmentation based on collaborative weight assignment RGB-depth fusion strategy. IEEE/ASME Transactions on Mechatronics. Nov. 14, 2023;29(3):2032-43. (Year: 2023).*

Boerdijk W, Sundermeyer M, Durner M, Triebel R. Self-supervised object-in-gripper segmentation from robotic motions. arXiv preprint arXiv:2002.04487. Feb. 11, 2020. (Year: 2020).*

Matsuno D, Hachiuma R, Saito H, Sugano J, Adachi H. Pose estimation of stacked rectangular objects from depth images. In2020 IEEE 29th International Symposium on Industrial Electronics (ISIE) Jun. 17, 2020 (pp. 1409-1414). IEEE. (Year: 2020).*

Pathak et al., "Learning Instance Segmentation By Interaction," 2018 IEEE/CVF Conference on Computer Vision and Pattern Recognition Workshops (CVPRW), 2018, pp. 2155-2158.

Patten et al., "Action Selection for Interactive Object Segmentation in Clutter," 2018 IEEE/RSJ International Conference on Robots and Systems (IROS), 2018, pp. 6297-6304.

Suchi et al., "Easylabel: a Semi-Automatic Pixel-Wise Object Annotation Tool for Creating Robotic RGB-D Datasets," 2019 International Conference on Robotics and Automation ICRA, 2019, pp. 1-7.

* cited by examiner obtain dimension attribute data
of workspace 11 obtain dimension and/or shape
data of type of object

12 obtain initial depth map
13 generate grasping proposal
14 obtain first image subset
15 move stackable object out of
or into location in stacking
region

16 obtain second image subset
17

—·—·—·— detected bin
—————— reduced bin

102

103

50 apparatus communication
interface processor
54

52 memory
56 obtain first training
image subset

35 obtain
second
training
image
subset

39 identify an
error function obtain annotated
segmentation
mask as
ground truth

36

37

38

40

COMPUTER-IMPLEMENTED METHOD FOR GENERATING (TRAINING) IMAGES

CROSS REFERENCE

The present application claims the benefit under 35 U.S.C. § 119 of European Patent Application No. EP 22 19 6199.8 filed on Sep. 16, 2022, which is expressly incorporated herein by reference in its entirety.

FIELD

The present invention relates to a computer-implemented method for generating labelled training images, and an associated apparatus, system, method of training a machine learning model, and computer program element. The present invention also relates to a computer-implemented method for autonomously generating a set of images characterizing a manipulation of at least one stackable object, and an associated system, apparatus, computer program element, and computer readable medium.

BACKGROUND INFORMATION

Machine learning models that perform object segmentation can be used within an automated robotic system to identify objects that an automated robotic manipulator can grasp, in order to fulfil an object translation task such as removing an object from a container, or placing object inside a container. However, machine learning models that perform object segmentation are also sensitive to visual context. In practice, a large amount of training data is required to train the machine learning models that implement object segmentation, or that can be used at other stages of an automatic robotic manipulation pipeline.

Acquisition of training data is time consuming and usually requires human intervention.

Exemplary prior work in this field is now discussed. Each of these documents discuss obtaining images of a collection of diverse objects and shape and color, which are not similar to each other. The objects are scattered on a flat, borderless surface such as a table or floor. This object placement approach means that objects can be easily moved by a robotic manipulator, and can slide sideways under robotic manipulation.

The CVPR paper "Learning instance segmentation by interaction" by Deepak Pathak, Yide Shentu, Dian Chen, Pulkit Agrawal, Trevor Darrell, Sergey Levine, and Jitendra Malik (21 Jun. 2018, https://doi.org/10.48550/arXiv.1806.08354) describes the use of a pre-trained object segmentation model for forming an initial hypothesis. The object annotation approach relies predominantly on clustering optical-flow.

The conference paper "Action selection for interactive object segmentation in clutter" by Timothy Patten, Michael Zillich, and Markus Vincze (2018 IEEE/RSJ International Conference on Robots and Systems, Madrid, Spain, Oct. 1-5, 2018), 978-1-5386-8094-0 is another publication in this field. The authors propose the generation of annotations by arranging an RGB-D point cloud into an oct tree, calculating similarities between its voxels, and applying graph-cut to cluster its nodes into separate objects. A robot is used to resolve ambiguity, by pushing objects. This separates neighbouring objects, and enables the calculation of optical flow, which is used as an additional feature for similarity calculations.

The conference paper "EasyLabel: a semi-automatic pixel-wise object annotation tool for creating robotic RGB-D datasets" by Markus Suchi, Timothy Patten, David Fischinger, and Markus Vincze (2019 International conference on Robotics and automation ICRA), Montreal, Canada, May 20-24, 2019, 978-1-5386-6027-0 is another paper in this field. This technique requires a human operator to add or remove objects from the scene. Annotations are generated from the depth differences between before and after frames. A new object is added before the after frame is obtained.

The aforementioned techniques may, however, be further improved.

SUMMARY

According to a first aspect of the present invention, there is provided a computer-implemented method for generating labelled training images characterizing automatic robotic or manual manipulation of a plurality of stackable objects in a workspace. According to an example embodiment of the present invention, the method comprises:

obtaining a first training image subset obtained at a first time index comprising a depth map and a visual image of a plurality of stackable objects in a stacking region of a workspace optionally comprising a robotic manipulator;

obtaining a second training image subset obtained at a second time index comprising a depth map and a visual image of the stacking region in the workspace, wherein the second training image subset characterizes a changed spatial state of the stacking region;

computing a depth difference mask based on the depth maps of the first and second training image subsets;

computing a visual difference mask based on the visual images of the first and second training image subsets;

generating an annotated segmentation mask using the depth difference mask and/or the visual difference mask, wherein the annotated segmentation mask localizes a stackable object based on the spatial state of the stacking region at the first time index, before the spatial state was changed by automatic robotic or manual manipulation of the at least one stackable object in the workspace.

According to a second aspect of the present invention, there is provided an apparatus for generating labelled training images characterizing automatic robotic or manual manipulation of a plurality of stackable objects in a workspace. According to an example embodiment of the present invention, the apparatus comprises a communication interface a processor and a memory. The communication interface is configured to obtain a first training image subset obtained at a first time index comprising a depth map and a visual image of a plurality of stackable objects in a stacking region of a workspace optionally comprising a robotic manipulator, to obtain a second training image subset obtained at a second time index comprising a depth map and a visual image of the stacking region in the workspace, wherein the second training image subset characterizes a changed spatial state of the stacking region.

The processor is configured to compute a depth difference mask based on the depth maps of the first and second training image subsets, to compute a visual difference mask based on the visual images of the first and second training image subsets, and to generate a segmentation mask using the depth difference mask and/or the visual difference mask, wherein the segmentation mask localizes a stackable object based on the spatial state of the stacking region at the first time index, before the spatial state was changed by automatic robotic or manual manipulation of the at least one stackable object in the workspace.

According to a third aspect of the present invention, there is provided a computer-implemented method for training a machine learning object segmentation model. According to an example embodiment of the present invention, the method comprises:

obtaining a first training image subset comprising a depth map and a visual image of a plurality of stackable objects in a stacking region of a workspace comprising a robotic manipulator;

obtaining a second training image subset comprising a depth map and a visual image of the stacking region in the workspace, wherein the second training image subset characterizes a changed spatial state of the stacking region; and obtaining an annotated segmentation mask as ground truth, wherein the annotated segmentation mask has been computed according to the method of the first aspect or its embodiments using the first training image subset and the second training image subset;

providing the first training image subset and the second training image subset as inputs to a machine learning object segmentation model;

generating an automatic segmentation using the machine learning object segmentation model;

identifying an error function between the automatic segmentation and the segmentation mask; and iterating the machine learning object segmentation model using the error function until a convergence criterion has been reached, to thus generate a trained machine learning object segmentation model; and outputting the trained machine learning object segmentation model.

According to a fourth aspect of the present invention, there is provided a system for robotically manipulating of a plurality of stackable objects. According to an example embodiment of the present invention, the system comprises:

a robotic manipulator configured to manipulate a plurality of objects within a target space of a workspace comprising at least one stacking region for stacking a plurality of objects, and at least one ancillary region for storing stackable objects;

an imaging system configured to obtain a plurality of depth maps and a plurality of two-dimensional images of the at least one stacking region of the workspace;

a controller comprising a machine vision system comprising the trained machine learning object segmentation model generated according to the third aspect; and a communications system configured to communicably couple at least the robotic manipulator, the imaging system, and the controller.

According to a fifth aspect of the present invention, there is provided a computer program element comprising a set of machine readable instructions which, when executed by a processor, cause a computer to perform the steps of the computer-implemented method according to the first or third aspects of the present invention.

According to a sixth aspect of the present invention, there is provided a computer-implemented method for autonomously generating a set of images characterizing a robotic manipulation of at least one stackable object. According to an example embodiment of the present invention, the method comprises:

obtaining dimension attribute data of a workspace in a coordinate system of a robotic manipulator,

obtaining dimension and/or shape attribute data of at least one type of object of the plurality of stackable objects;

obtaining an initial depth map of a plurality of stackable objects together comprising a stack in the stacking region;

generating a grasping proposal using the initial depth map;

obtaining a first image subset of the stacking region using an imaging system comprising a depth camera and a visual camera, wherein the first image subset comprises at least one depth map and at least one 2D image of the stacking region;

moving a stackable object out of, or into, a location in the stacking region using the robotic manipulator according to the grasping proposal, to thus change the spatial state of the stacking region; and obtaining a second image subset of the stacking region using the imaging system, wherein the second image subset also comprises at least one depth map and at least one 2D image of the stacking region in the changed spatial state.

According to a seventh aspect of the present invention, there is provided an apparatus for autonomously generating a set of images characterizing a robotic manipulation of a plurality of stackable objects. According to an example embodiment of the present invention, the apparatus comprises a communication interface configured to communicate with at least a robotic manipulator and an imaging system, a processor, and a memory.

According to an example embodiment of the present invention, the processor is configured to obtain dimension attribute data of a workspace in a coordinate system of the robotic manipulator, to obtain dimension and/or shape attribute data of at least one type of object of the plurality of stackable objects, to obtain a first image set of a stacking region using an imaging system comprising a depth camera and a visual camera, wherein the first image subset comprises at least one depth map and at least one 2D image of the stacking region, to move a stackable object out of, or into, a location in the stacking region using the robotic manipulator according to a grasping proposal, to thus change the spatial state of the stacking region, to obtain a second image subset of the stacking region using the imaging system, wherein the second image subset also comprises at least one depth map and at least one 2D image of the stacking region in the changed spatial state, and to output the first and second image subsets.

According to an eighth aspect of the present invention, there is provided a system for autonomously generating a set of images characterizing a robotic manipulation of a plurality of stackable objects. According to an example embodiment of the present invention, the system comprises:

a robotic manipulator configured to manipulate a plurality of objects within a target space of a workspace comprising at least one stacking region for stacking a plurality of objects, and at least one ancillary region for storing stackable objects;

an imaging system configured to obtain a plurality of depth maps and a plurality of two-dimensional images of the at least one stacking region of the workspace;

an apparatus according to the seventh aspect; and a communications system configured to communicably couple at least the robotic manipulator, the imaging system, and the apparatus.

According to a ninth aspect of the present invention, there is provided a computer program element comprising a set of machine readable instructions which, when executed by a processor, cause a computer to perform the steps of the computer-implemented method according to the sixth aspect of the present invention, or its embodiments.

Technical effects of the foregoing aspects are as follows. The above-discussed approaches in the "Background" section require some form of object segmentation to form an initial grasping hypothesis. Furthermore, the use of robots in the aforementioned techniques is ancillary (for removing uncertainty, for example). The aforementioned work all use segmentation algorithms and robotic systems that handle household objects that look quite different from each other. The aforementioned work deals in obtaining RGB and depth training data from relatively sparse scenes.

In many practical systems, it may not be possible to perform object segmentation to form the initial grasping hypothesis. For example, a robotic system for palletising or containerising boxes in a logistic warehouse may be required to palletise, or containerise, a box having a previously unseen shape or color. Therefore, according to the techniques of the present specification, an automated robotic rig for obtaining example images that can be used as the input to a training process of an object segmentation machine learning model can be provided at a client site. When a new type of box is encountered but has not been seen before by an automated robotic manipulation system at the client site, the automated robotic rig discussed in the present specification can be deployed to obtain raw depth and RGB images that are then used to train an object segmentation machine learning model.

Notably, according to an example embodiment of the present invention, the grasping proposal can be generated based only on the initial depth map of the workspace (e.g., an image including depth values of the workspace). Other image data, such as 2D image data, is not required to formulate the grasping proposals or to effect the grasping sequence. The term "visual image" is used in the present disclosure to refer to a distribution of amplitude of color(s) (including black/white) representing the workspace as captured with an imaging optical system. The attribute "visual" includes wavelengths not perceptible by the human eye (e.g., infrared wavelengths).

Once the updated object segmentation machine learning model has been trained on the data automatically obtained using the automated rig, the automated robotic handling system at the client site may be updated with the updated object segmentation machine learning model, to thus enable it to handle the previously unseen type of box. Beneficially, the automated robotic rig can be operated on a stack of the previously unseen type of box fully automatically, and without requiring user intervention to add and remove boxes during the generation of the raw training data. Furthermore, the techniques according to the present specification enable an automated rig for obtaining raw training data to handle densely stacked boxes. This is a ubiquitous use case in logistic warehouses. The visual and depth data obtained by an automated robotic rig of a scene comprising densely stacked boxes are much denser and contain multiple object to object contacts. Such layouts are not suitable for simplistic object manipulation strategies (such as inserting one object into a sparse scene). Furthermore, uncertainty resolution techniques involving pushing objects within a sparse scene cannot be applied to a stack of objects without risking collapsing the stack, or moving other objects within the scene parasitically. Each scene consists of multiple replicas of the same type of object, which in some cases it might appear as a continuum and challenge the related art segmentation models.

Accordingly, the example embodiments of the present invention provide an automated pipeline for obtaining and/or labelling raw training data of a machine learning object segmentation algorithm. In one example, the automated pipeline is configured to process scenes containing densely stacked boxes, or other densely stackable objects. According to the techniques discussed herein, an object manipulation approach is provided in which, at each iteration, a stackable object is grasped by an automated robotic manipulator or by manual manipulation and removed from the scene (workspace). Although video data of the entire removal of the object from the scene may be captured, this is not essential. Only a before and after image of the field of view is needed, for each iteration. Raw training data generated by the present technique therefore requires less memory to store, and the processing of less data during the training procedure. This does not exclude using depth-video data of the removal of a sequence of objects from a stack, and then post-processing the video to synthesise the before and after images relative to each removed or added object.

A subsequent object annotation algorithm can, for example, annotate the depth difference between the before and after frames. The techniques of the present specification also enable the detection or validation of unexpected motion or grasping success, and its correction, or can handle grasping failures. This means that the technique of the present specification can be fully automated, and does not require a human operator and perfect data collection sequences. Parasitic motion may be compensated for.

Therefore, as opposed to prior work, the object mitigation strategy of the present specification can handle stackable objects that are packed and confined inside a container. The technique is aware of manipulation failures, such as grasp failure and parasitic unwanted motion, and these may be compensated for. Even if a failure cannot be compensated for, a partial annotation sequence can still be provided.

BRIEF DESCRIPTION OF THE DRAWINGS

Exemplary embodiments of the present invention are depicted in the figures (the same figures are used to explain different aspects of the present invention), which are not to be construed as limiting the present invention, and are explained in greater detail below.

DETAILED DESCRIPTION OF EXAMPLE EMBODIMENTS

A major task in logistic centres (warehouses) is palletising or depalletizing. An example is unloading a large carton box from a Euro pallet. Robotic grasping services applicable in such contexts rely on machine learning-based object segmentation. However, object segmentation often fails when generalising on unseen objects. An example of an unseen object is a new product container, for which depth and RGB image data were not included in the training set.

The grasping service discussed in the present specification is intended to be deployed at a customer site (such as a logistics warehouse) to enable agile and automatic generation of new training data for hard-case items, with minimal human intervention. Specifically, obtaining grasping sequences of the palletising or depalletizing of stackable objects is enabled.

Figure 1:
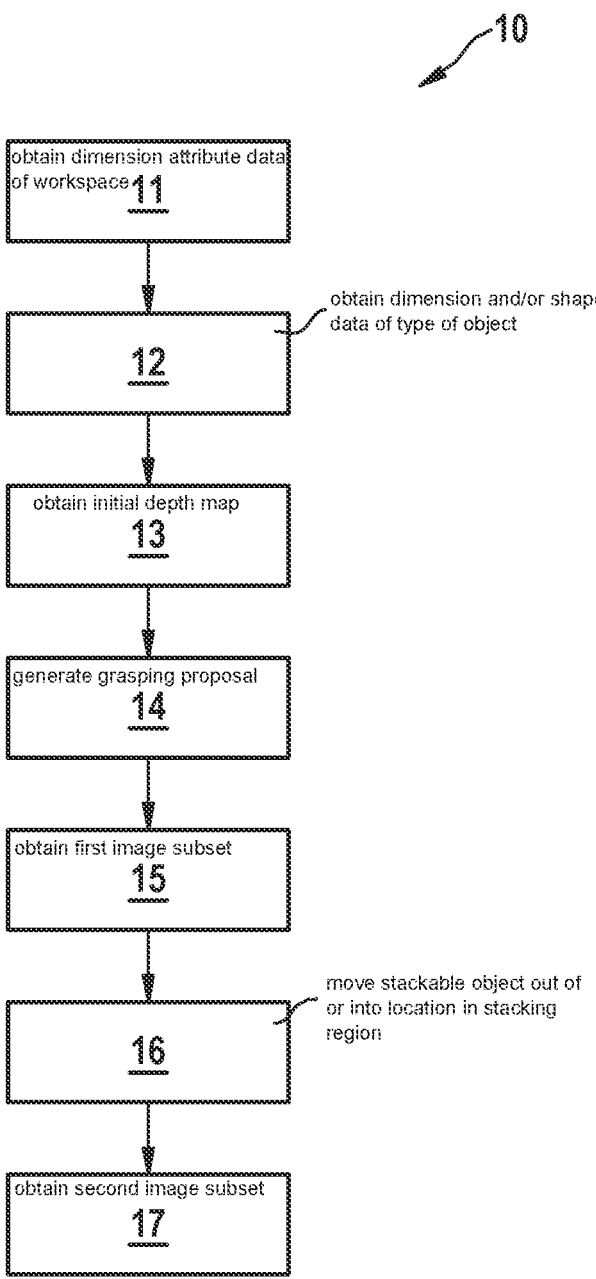
FIG. 1 schematically illustrates a method according to the sixth aspect of the present invention.

FIG. 1 schematically illustrates a method according to the sixth aspect.

According to a sixth aspect, there is provided a computer-implemented method 10 for autonomously generating a set of images characterizing a robotic manipulation of at least one stackable object, comprising:

obtaining 11 dimension attribute data of a workspace 22 in a coordinate system of a robotic manipulator, obtaining 12 dimension and/or shape attribute data of at least one type of object of the plurality of stackable objects;

obtaining 13 an initial depth map of a plurality of stackable objects 24 together comprising a stack in the stacking region 22*a*;

generating 14 a grasping proposal P1 using the initial depth map;

obtaining 15 a first image subset 30 of the stacking region 22*a* using an imaging system comprising a depth camera 28*a* and a visual camera 28*b*, wherein the first image subset 30 comprises at least one depth map D1 and at least one 2D image RGB1 of the stacking region 22*a*;

moving 16 a stackable object 24 out of, or into, a location in the stacking region 22*a* using the robotic manipulator according to the grasping proposal P1, to thus change the spatial state of the stacking region 22*a*; and obtaining 17 a second image subset 32 of the stacking region 22*a* using the imaging system, wherein the second image subset also comprises at least one depth map D2 and at least one 2D image RGB2 of the stacking region 22*a* in the changed spatial state.

The method according to the sixth aspect, and its embodiments, therefore, provides a grasping service that is used for data collection.

According to an embodiment, the first and second image subsets are obtained without the intervention of a human operator and without the use of object segmentation.

Figure 2:
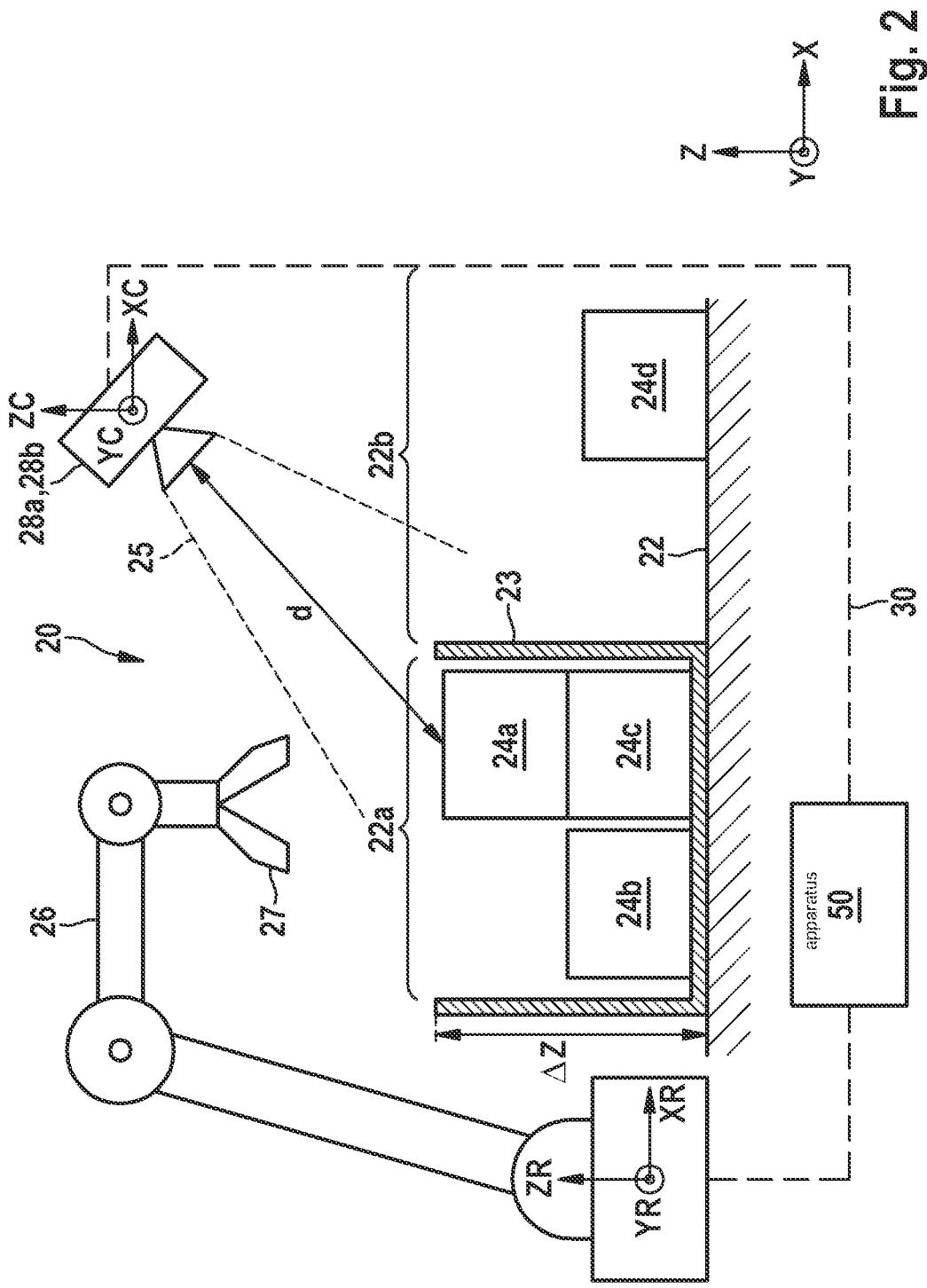
FIG. 2 schematically illustrates a system for automatically generating training data and a system according to the eighth aspect of the present invention.

FIG. 2 schematically illustrates a system for automatically generating training data using robotic manipulation or manual manipulation of a plurality of stackable objects and/or a system for autonomously generating a set of images characterizing a robotic manipulation of a plurality of stackable objects. In the subsequent examples a robotic manipulation is described, a manual manipulation can take place and be recorded in the same system having or not having a robotic manipulator alternatively or in addition. In addition or alternatively, training data can also be generated based on depth maps and visual images of manual manipulation of a plurality of stackable objects. In these examples, a workspace might not include a robotic manipulator. In other words, the image data for generating the training data can also be produced by manual manipulation of stackable objects.

A high-level description of the system will now be given to facilitate further description of the method. In particular, the system 20 comprises a workspace 22 that, in examples, is a workbench, a table, or an area of a warehouse used for palletising and depalletizing. Workspace 22 may have lighting, color, and shape attributes similar or identical to the context in which an automated robotic palletising or depalletizing system is intended to be used. The workspace 22 is further divided into a stacking region 22*a* (in which formed into a stack by a robotic manipulator 26, or removed from a stack by a robotic manipulator 26).

As illustrated, the stacking region 22*a* of the workspace 22 comprises a container 23 having sides with a total height of $\Delta z$ units. The container 23 comprises three stackable objects 24*a-c*, in this case boxes. The workspace 22 further comprises an ancillary region 22*b* that is within the target space of the robotic manipulator 26. The ancillary region 22*b* is, in examples, a flat portion of warehouse floor, or a more complicated element such as a conveyor belt, or an actuator of another robotic manipulator (not shown).

The robotic manipulator 26 is configured to move an end effector 27 within a configuration space comprising the stacking region 22*a* and the ancillary region 22*b*. The robotic manipulator 26 can be selected from one of a variety of means such as a robotic arm palletizer, a four-axis Cartesian gantry palletiser, or any other means capable of sequentially removing or adding stackable objects 24 from, or onto, a stack.

The robotic manipulator 26 comprises an end effector 27 that is capable of being moved into position to grip a stackable object 24*a-d* located in either the stacking region 22*a* and/or the ancillary region 22*b* of the workspace 22. For example, the end effector may be a suction cup, a claw, or any other end effector capable of moving stackable objects.

It is not essential that the stacking region 22*a* of the workspace 22 comprises a container 23 capable of containing a plurality of stackable objects 24a-c. In some cases, the workspace 22 can accommodate a stack of stackable objects 24a-c that are being palletised or depalletized without a container wall 23 present. This may be the case in systems that depalletize or palletise shrink-wrapped pallets, for example.

At least the stacking region 22a of the workspace 22 is in the field of view 25 of a depth camera 28a and a 2D optical image camera 28b. In an example, the ancillary region 22b of the workspace 22 is also in the field of view 25 of the depth camera 28a and the 2D optical image camera 28b. As illustrated, the depth camera 28a and the 2D optical image camera 28b (in an example, an RGB camera, black and white camera, or infra-red camera) are offset at an angle from the container 23. In a case where no container 23 is present, the depth camera 28a and the 2D optical image camera 28b may be located at an even more oblique angle to the stack of stackable objects 24a-c. Furthermore, the depth camera 28a and the 2D optical image camera 28b can be located directly above the stack of stackable objects 24a-c.

In an embodiment, the depth camera 28a and the 2D optical image camera 28b are collocated in the same enclosure (as illustrated) so that depth maps and RGB images are registered by virtue of the co-location of the depth camera 28a and the 2D optical image camera 28b. In another embodiment, the depth camera 28a and the 2D optical image camera 28b are located at different locations around the workspace 22, albeit with fields of view 25 image substantially the same portions of the workspace 22. In a case where the depth camera 28a and the 2D optical image camera 28b are located different locations around workspace 22, registration of the depth map and the optical image may be required.

The depth camera 28a can use techniques such as structured light, active stereoscopy, and/or coded light, or alternatively time-of-flight and lidar to obtain the distance d. The depth camera 28a is configured, for each pixel within the field of view 25, to obtain a distance, d, between the depth camera 28a and the workspace 22, or a stackable object 24 within the workspace 22. In the example of FIG. 2, if the stackable object 24a is removed from the container 23, the distance, d is elongated, and the depth camera 28a is able to detect a reduction in the height of the stack of stackable objects 24. A skilled person will appreciate that when the depth camera 28a is located perpendicularly above the stackable objects 24a-c, the distance between the depth camera 28a and the stackable objects 24a-c, as compared to the distance between the depth camera 28a and the floor of the workspace 22 (or a pallet upon which the stackable objects are stacked), can be used to calculate the height $\Delta z$ of the stack of stackable objects 24a-c. In the illustrated case, the depth camera 28a is placed at an angular offset to the workspace 22, although the application of trigonometry, for example, the height $\Delta z$ of the stack of stackable objects 24a-c, or a related metric, can still be computed.

The robotic manipulator 26, the depth camera 28a, and the 2D optical camera 28b are communicably coupled to an apparatus 50 using a communications network 30. The communications network 30 may comprise, one or combination of modalities such as Wi-Fi™, CANBUS™, PROFIBUS™, Ethernet, and the like, enabling suitable communication with the robotic manipulator 26, the depth camera 28a, the 2D optical camera 28b, and the apparatus 50. Furthermore, the apparatus 50 can, in embodiments, be collocated with the workspace 22. In other embodiments, the apparatus 50 can be located remotely from the workspace 22. For example, analysis of the images from the depth camera 28a, and the 2D optical camera 28b can be remotely analysed at a datacentre, and movement commands for the robotic manipulator 26 can be sent from the datacentre.

As will be explained, in operation, the apparatus 50 obtains an optical image and a depth map before manipulating a stackable object. These images form the first training image subset. The apparatus 50 instructs the robotic manipulator 26 to grasp the stackable object 24a using the end effector 27 on the basis of a grasping proposal that is generated according to the procedure to be discussed below. The stackable object 24a is removed from the container according to the grasping proposal, and placed in, for example, the ancillary region 22b. This forms a change in spatial state of the stack of stackable objects 24 in the workspace 22 (or in the container 23). The apparatus 50 obtains an optical image and a depth map after moving stackable object 24a. These images form the second training image subset. The apparatus 50 continues to follow this loop until a plurality of training images are obtained. Human intervention is not required to obtain the plurality of training images. Therefore, a large number of training images may be obtained at low cost. Although this specification focuses on the case of removing stackable objects 24 from a stack of objects (as is the case when depalletizing stackable objects), similar principles are useful for obtaining training images of a process of stacking objects (as is the case when depalletizing stackable objects).

In this specification, "dimension attribute data" contains, for example, at least one dimension of the workspace in centimetres or metres relevant to the movement range of the robotic manipulator 26. If the workplace is square, or rectangular, the dimension attribute data is the width and length of the workplace 22. The dimension attribute data can define the radius of a circular workspace, or may define dimensions of an arbitrarily shaped workspace 22. The dimension attribute data can also comprise a height limit of the workspace. The fact that the dimension attribute data is registered to accordance system of the robotic manipulator 26 enables the robotic manipulator to move reliably within the workspace 22. The dimension attribute data is, in an example, given in the coordinates of the robotic manipulator 26.

In this specification, the term "dimension attribute data of a type of object of a stackable object" refers, in an example, to the dimensions of one or more boxes to be manipulated by the robotic manipulator. In an example, all stackable objects 24 in the plurality of stackable objects 24a-d have common dimensions. In an example, the stackable objects 24 and the plurality of stackable objects 24a-d can have different dimensions. For example, the grasping proposal and the collection of first and second image subsets of the stacking region can be used to enhance the training of an object segmentation model that not only handles new (as in, unseen by a previous iteration of the object segmentation model) types of stackable objects 24, but also handles new stacking configurations of heterogeneously sized pluralities of stackable objects such as a mixed loads.

In an embodiment, the dimension attribute data is given with an accuracy of approximately 20%, 10%, 5%, or 1% of the dimensions of the stackable object. For example, a box measuring 20 cm×10 cm×5 cm can be provided with an error bound of 1 cm.

Therefore, if the stackable object 24 is a cubic box, the dimension attribute data is a length of each side of the cubic box. If the stackable object 24 is a rectangle box, the dimension attribute data is a length, width, and depth of the sides of the rectangular box. More complicated dimension attribute data can be provided for more complicated shapes of stackable object.

The "shape attribute data" provides information to the computer implemented method defining the shape of the stackable object. Typically, the stackable object will be cubic or a rectangular cuboid, although the shape attribute data can define any shape that is stackable. In a particular embodiment, the "dimension attribute data" and the "shape attribute data" is provided in the form of a 3D solid model, although basic length dimensions of edges of the stackable object can also be used.

According to an embodiment, an initialisation step of the computer-implemented method further comprises obtaining a camera projection matrix, and/or camera projection parameters, of the imaging system 28 and its component depth camera 28a and visual camera 28b. In an example, the depth camera 28a and the visual camera 28b have different camera projection matrix, and/or camera projection parameters. As may be understood by a skilled person, the camera projection matrix, and/or camera projection parameters, of the imaging system 28 in an image pre-processing pipeline to correct for distortions introduced by the visual imaging system. A camera projection matrix is a mapping between the 3D environment imaged by the camera 28, and a 2D image generated by the camera 28. Based on the pinhole camera model, a camera matrix defines intrinsic parameters such as the principal point, image sensor format, and focal length and also encompasses lens distortion. A camera matrix can also define extrinsic parameters transforming 3D world coordinates 3D camera coordinates.

According to an embodiment, an initialisation step of the computer-implemented method further comprises registering the coordinate system (xc, yc, zc) of the camera 28 to the coordinate system (xr, yr, zr) of the robotic manipulator 26. If a depth camera 28a and a visual camera 28b are located at different locations around the workspace 22, the registration may be a composite procedure requiring separate registration of the depth camera 28a and the visual camera 28b. In some embodiments, the camera 28 may be fixed to the robotic manipulator 26, such that it is already in the coordinate system of the robotic manipulator 26. The step of registering the coordinate system (xc, yc, zc) of the camera 28 to the coordinate system (xr, yr, zr) of the robotic manipulator 26 is a homogenous transform from the coordinate system of the camera 28 to the coordinate system of the robotic manipulator 26.

According to an embodiment, the first and second image subsets are obtained without the intervention of a human operator and without the use of object segmentation.

The techniques according to the first to fifth aspects will be discussed in more detail subsequently (a discussion of the techniques of the sixth to ninth aspects will be given further down).

Figure 3:
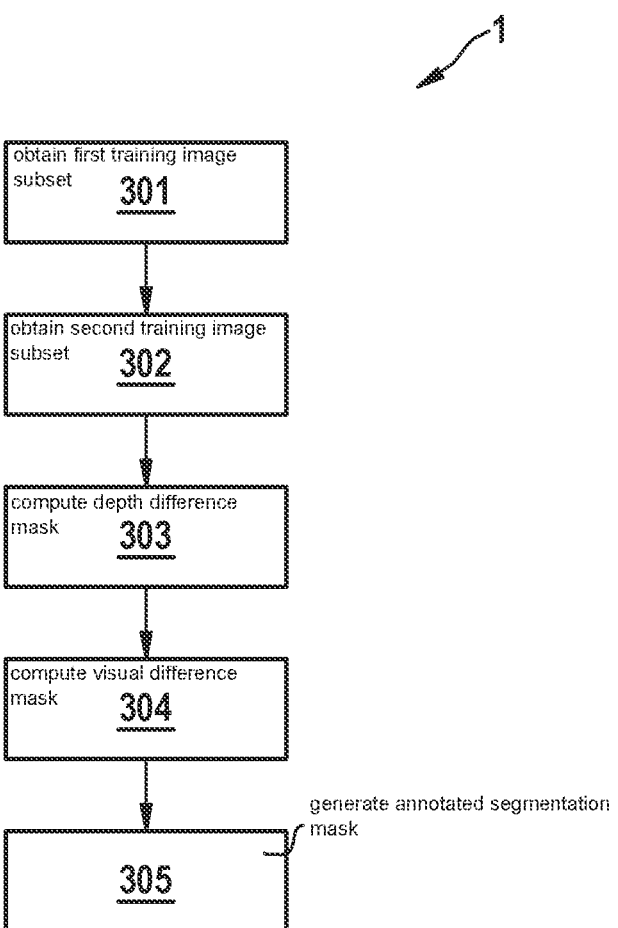
FIG. 3 schematically illustrates a computer-implemented method according to the first aspect of the present invention.

FIG. 3 schematically illustrates a computer-implemented method 1 according to the first aspect.

According to a first aspect, there is provided a computer-implemented method 10 for generating labelled training images ΔD, ΔRGB characterizing automatic robotic manipulation or manual manipulation of a plurality of stackable objects 24 in a workspace 22, comprising:

obtaining 301 a first training image subset obtained at a first time index comprising a depth map D1 and a visual image RGB1 of a plurality of stackable objects 24 in a stacking region 22a of a workspace 22 optionally comprising a robotic manipulator 26;

obtaining 302 a second training image subset obtained at a second time index comprising a depth map D2 and a visual image RGB2 of the stacking region 22a in the workspace 22, wherein the second training image subset characterizes a changed spatial state of the stacking region 22a;

computing 303 a depth difference mask ΔD1 based on the depth maps of the first and second training image subsets;

computing 304 a visual difference mask ΔRGB based on the visual images of the first and second training image subsets;

generating 305 an annotated segmentation mask M using the depth difference mask ΔD1 and/or the visual difference mask ΔRGB1, wherein the annotated segmentation mask localizes a stackable object 24 based on the spatial state of the stacking region at the first time index, before the spatial state was changed by automatic robotic or manual manipulation of the at least one stackable object in the workspace 22.

An example approach for obtaining the first and second training image subsets using a grasping rig has been discussed in relation to the system of FIG. 2 above. The computation of a depth difference mask ΔD1, may be achieved by subtracting a depth map D1 of the first training subset from a depth map of the second training subset. The computation of a visual difference mask ΔRGB may be achieved by subtracting a visual image of the first training subset from a visual image of the second training subset. Furthermore, the depth difference mask and the visual difference mask are computed using corresponding depth and visual images acquired at the same time indices.

According to an embodiment, the changed spatial state characterized by the second training image subset compared to the first training image subset is caused by a robotic manipulator 26 removing a stackable object from the stacking region, or adding a stackable object to the stacking region.

According to an example, a depth map and a visual image comprised in the first training image subset are registered if acquired by a dual mode D-RGB camera in which the depth and RGB cameras are fixed in the same coordinate system. According to example, if the depth camera and the RGB camera are separated from each other in space, a registration of the depth map and visual image obtained at the same time index is performed, so that each depth map and the visual image obtained at the same time index are registered.

According to example, the computer implemented method 10 further comprises obtaining dimension attribute data of a type of object of a stackable object 24 as discussed above. Therefore, coarse box dimensions are provided to improve the accuracy of the annotation process.

According to an embodiment, the method further comprises:

for a plurality of further training image subsets:

computing a plurality of further depth difference masks ΔD2, AD3 based on the depth maps of the further training image subsets;

computing a plurality of further visual difference masks ΔRGB2, ΔRGB3 based on the visual images of the further training image subsets; and generating a plurality of further segmentation masks M using corresponding time-indexed pairs of the further depth difference masks and further visual difference masks;

wherein each of the plurality of further segmentation masks M characterizes a further spatial state of the stacking region 22a at an incremented time index, before the spatial state was changed by automatic robotic or manual manipulation of a further plurality of stackable objects in the workspace.

Figure 4:
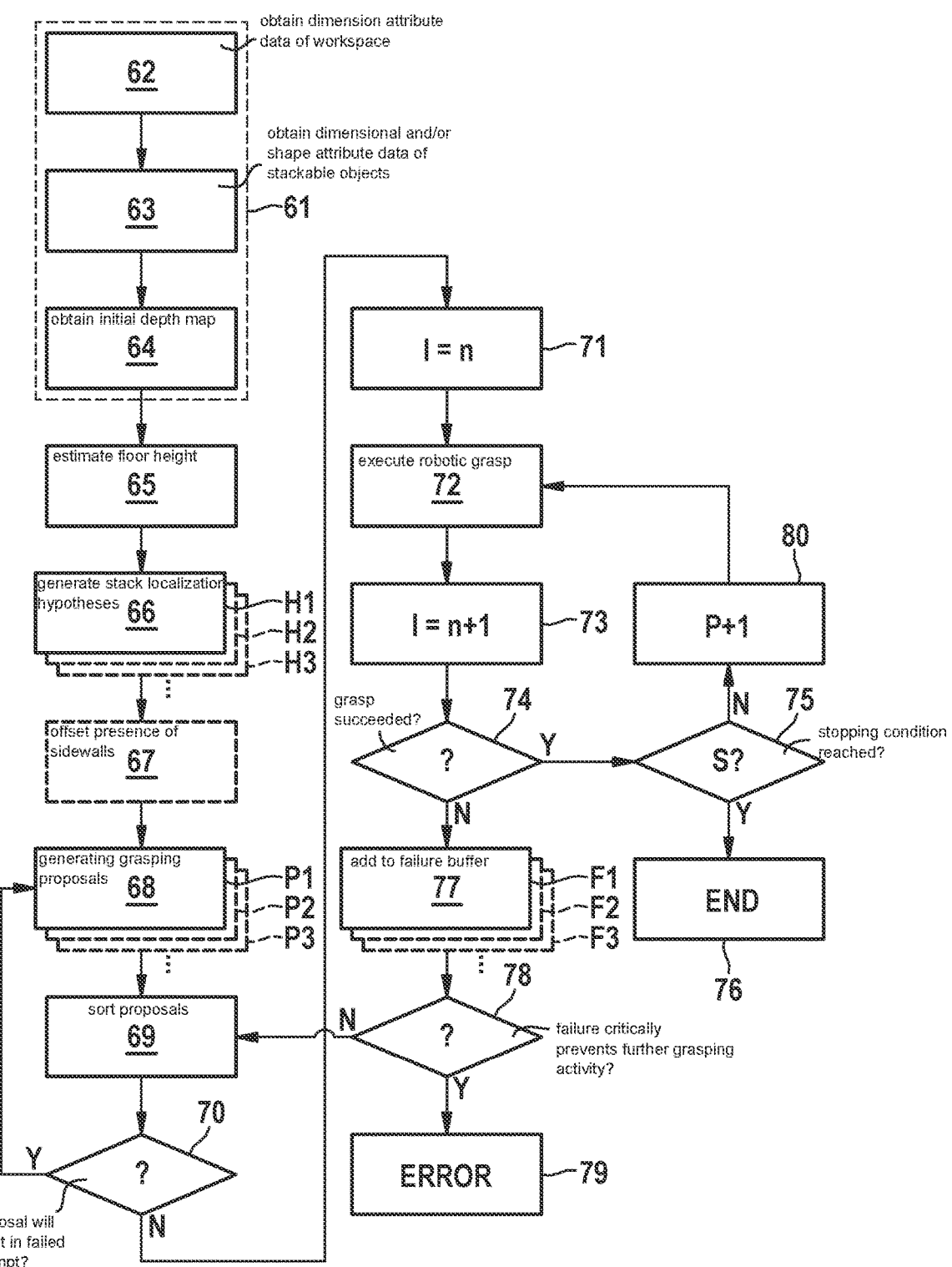
FIG. 4 schematically illustrates a method according to an example of the first aspect of the present invention.

FIG. 4 schematically illustrates segmentation method according to an example.

Single Object Annotation

Each pair of sequential images D1-RGB1, D2-RGB2 . . . can be considered as a pair of before and after images, for the specific box or stackable object that was removed at a corresponding grasping action GA . . . . In an example, for each pair of before and after depth and/or visual images, depth and RGB pixel-wise differences are computed.

As discussed in connection with the system illustrated in FIG. 2 above, a grasping action to remove a stackable object 24 from a stacking area 22a is performed at each of grasping actions GA1, GA2, GA3 in FIG. 4. FIG. 4 illustrates a first depth map D1 two underlying depth maps of boxes B and C that are partially occluded by an overlying depth map of box A. For representative purposes, the underlying depth maps of boxes are considered to be at depth level z=0, and overlying depth map of box A is considered to be at depth level z=1 (where depth level 0 is further from the depth camera than depth level 1). A skilled person will appreciate that these thresholds can be replaced with continuous dimensional measurements. FIG. 3 also illustrates a corresponding visual image RGB1. Features E and F are portions of the visual image RGB1 that correspond to the respective depth maps B and C of D1. Feature D is a portion of visual image representing and occluding stacked object. At GA1, the stacked object represented in the portion of depth map A and the portion of visual image D is removed from the scene using a robotic manipulator 26. At GA2, the stacked object at depth level z=0 represented in the portion of depth map C and the portion of visual image F is removed from the scene using a robotic manipulator 26. At GA3, the stacked object at depth level z=0 represented in the portion of depth map B and the portion of visual image E is removed from the scene using a robotic manipulator 26, thus having emptied the scene of three boxes. A skilled person will appreciate that more or fewer stacked objects may appear in the first and second set of training image subsets, and there may be more or fewer grasping actions GA.

FIG. 4 illustrates a sequence of depth difference masks ΔD1–ΔD3, and visual difference masks ΔRGB1–ΔRGB3. In an example, the depth difference mask ΔD1 shows the mask of the image A of the upper occluding stackable object at height z=1. In an example, the depth difference mask ΔD1 comprises a sequence number #1. The depth difference mask ΔD1 and the visual difference mask ΔRGB1 are processed to localize the object. This output serves as the segmentation mask for the given stackable object, at the "before" frame.

For example, depth difference mask ΔD1 is the depth segmentation mask for the object represented by reference numeral A before the grasping action GA1 has occurred.

According to an embodiment, the method comprises labelling the stackable object in either the first or the second training image subset using the segmentation masks of the depth map and/or the visual image.

Full Frame Annotation

According to an example, the method further comprises generating a full frame annotation of all objects visible in the depth map and/or the visual image of the first training image subset.

FIG. 4 illustrates a full frame annotation M (which can be either in the depth map domain or the visual image domain) comprising all annotations calculated from the sequence of depth maps and visual images. In other words, the single-object labels derived from all of the stackable objects are combined in a single reference frame. Grasping order and depth is taken into consideration to account for occlusions.

According to an embodiment, the method further comprises obtaining a depth range of the stacking region in the workspace; and masking the at least one depth map of the first training image subset and the at least one depth map of the second training image subset based on the obtained depth range. For example, the performance of an annotation algorithm, and the performance of a machine learning segmentation model training process, can be improved if extraneous depth measurements, that are not related to the stackable area 22a of the workspace, are removed from the first and second training image subsets. For example, a depth camera arranged over a workshop area viewing a raised table comprising the stacking area 22a and a portion of floor can be threshold it with the height of the floor and the height of the table in order to remove unwanted parts of the depth map showing the floor.

Figure 5:
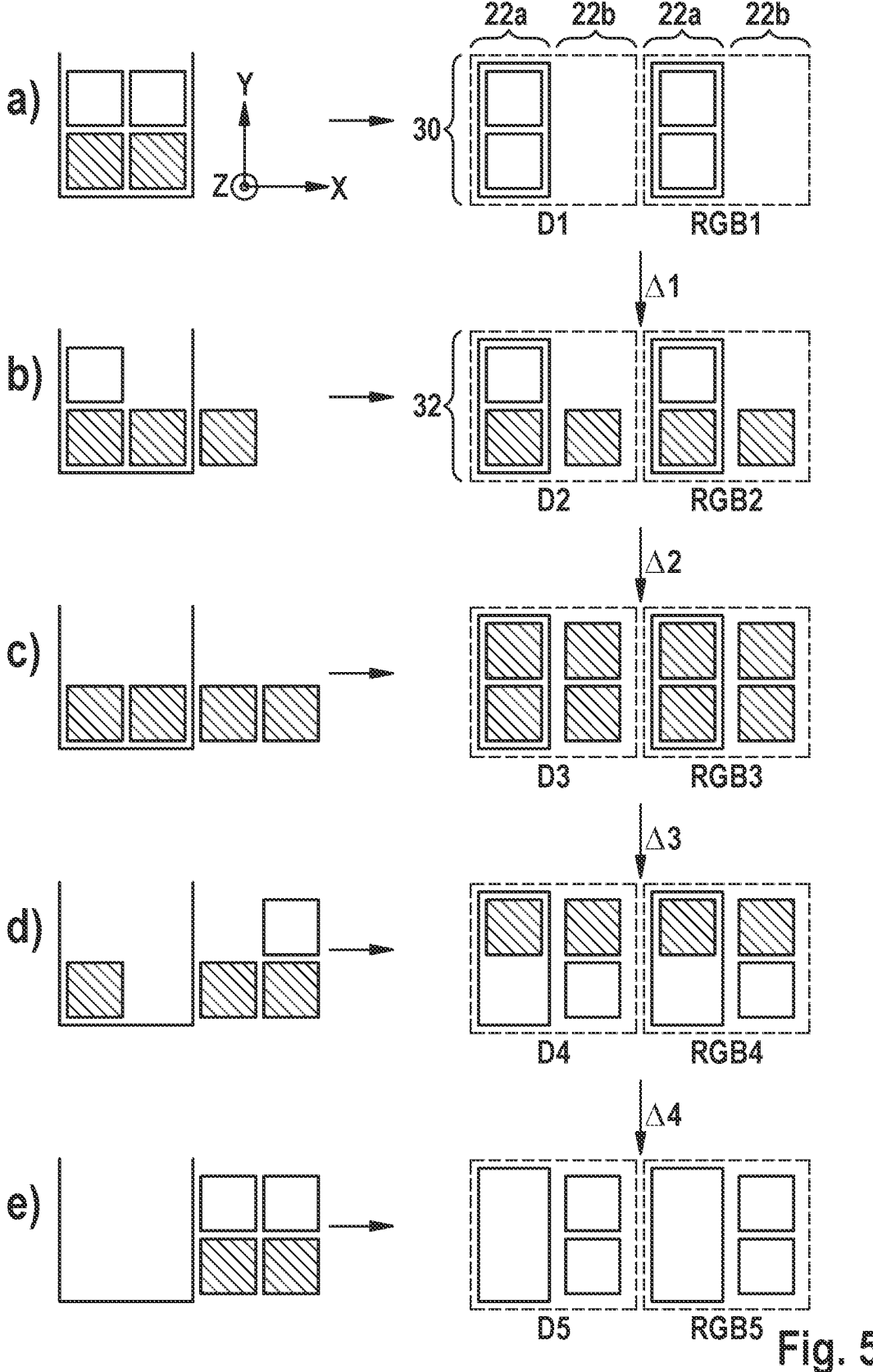
FIG. 5 schematically illustrates generating first and second image subsets, according to an example embodiment of the present invention.
Figure 6:
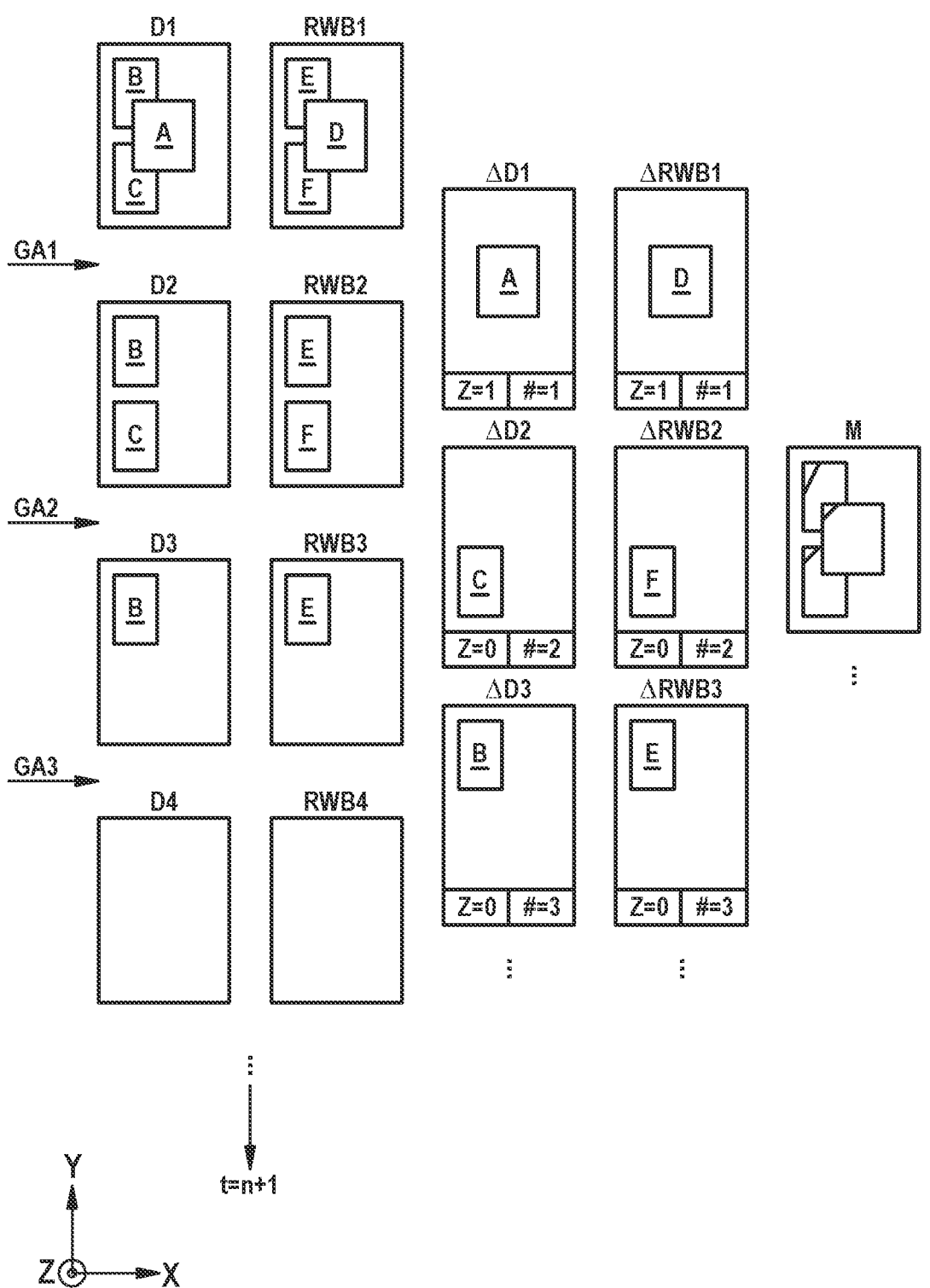
FIG. 6 schematically illustrates a segmentation method according to an example embodiment of the present invention.
Figure 7:
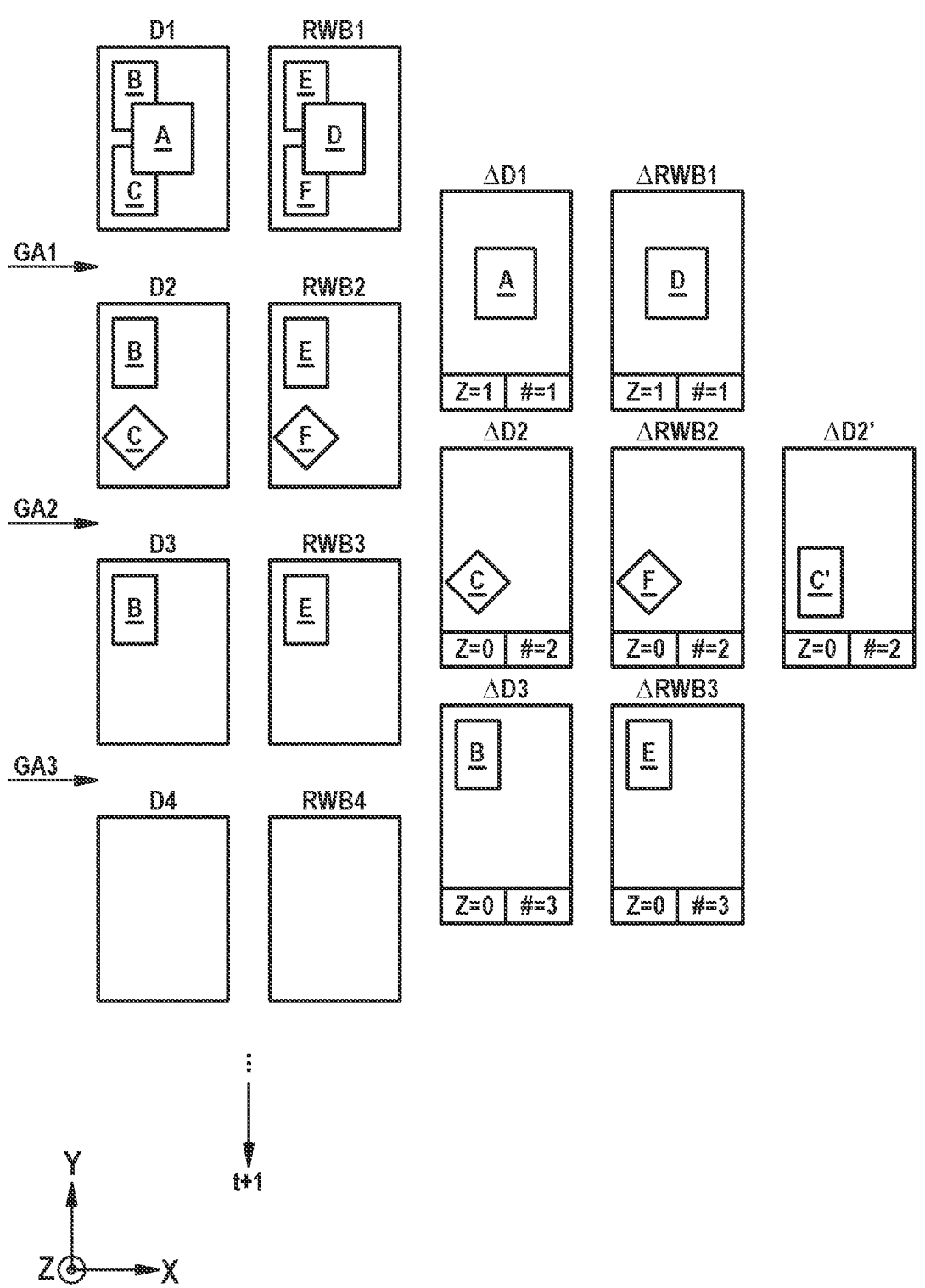
FIG. 7 schematically illustrates segmentation method with motion compensation according to an example embodiment of the present invention.

FIG. 5 schematically illustrates segmentation method with motion compensation according to an example.

According to an example, the method further comprises comparing a stackable object in a current depth map or current visual image with a corresponding stackable object in at least one previous depth map or previous visual image, based on the comparison, identifying that an object has been moved parasitically, and marking at least one segmentation mask based on the current depth map or current visual image with an inconsistency warning.

Prior to a removal during a grasping action GA, an object could be moved unintentionally by the robotic manipulator 26. Therefore, in this example, an approach is provided enabling the backwards checking for appearance consistency within the single-object segmentation masks. This approach is applicable either to the depth maps or the visual images.

One example of this scenario is that in FIG. 5, the removal of the stackable object level z=1 represented by the depth map A in D1 causes the unintentional movement of the stackable object represented by depth map C in D1, giving the partial rotation of stackable object represented by depth map C in D2. The application of unintentional motion also leads to the generation of an incorrect depth mask ΔD2.

In this embodiment, a backwards consistency check is applied between the depth map segmentation mask ΔD2, as against the location of the stackable object represented by depth map C in D1. The backwards consistency check reveals that the representation of depth map C in the depth map segmentation mask ΔD2 is partially rotated.

According to an example, the method further comprises generating at least one corrected segmentation mask by compensating the object that has been moved parasitically in the at least one segmentation mask marked as inconsistent, wherein the compensation is applied using one of optical flow, sparse feature matching, or template matching.

An example, the detection of a motion inconsistency triggers a motion warning. Motion warnings are handled by correcting the stackable object segmentation masks for the frames preceding the motion. FIG. 5 provides an illustration of the correction of depth map segmentation mask ΔD2 at corrected depth map segmentation mask ΔD2', in which the location of the stackable object represented by depth map C in the segmentation mask has been corrected to be consistent with the stackable object represented by depth map C in depth map D1. The same motion correction approach can be performed in relation to the RGB-derived image segmentation frames. The motion compensation between, for example, depth map segmentation mask ΔD2 and corrected depth map segmentation mask ΔD2' can be performed using one, or a combination, of optical flow, sparse future matching, or template matching.

Figure 8:
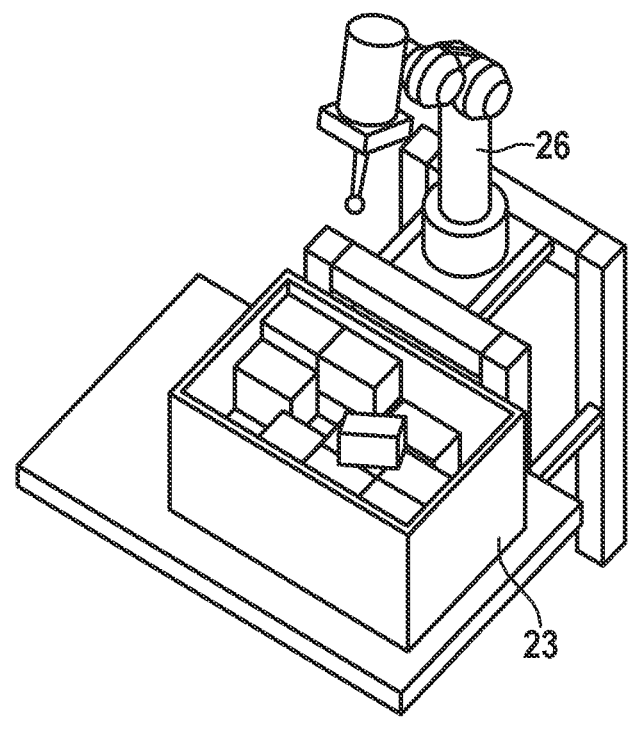
FIG. 8 is a depiction of a test area of an automatic robotic manipulator or a workspace with a stacking task.

FIG. 8 is a depiction of a test area of an automatic robotic manipulator.

Figure 9:
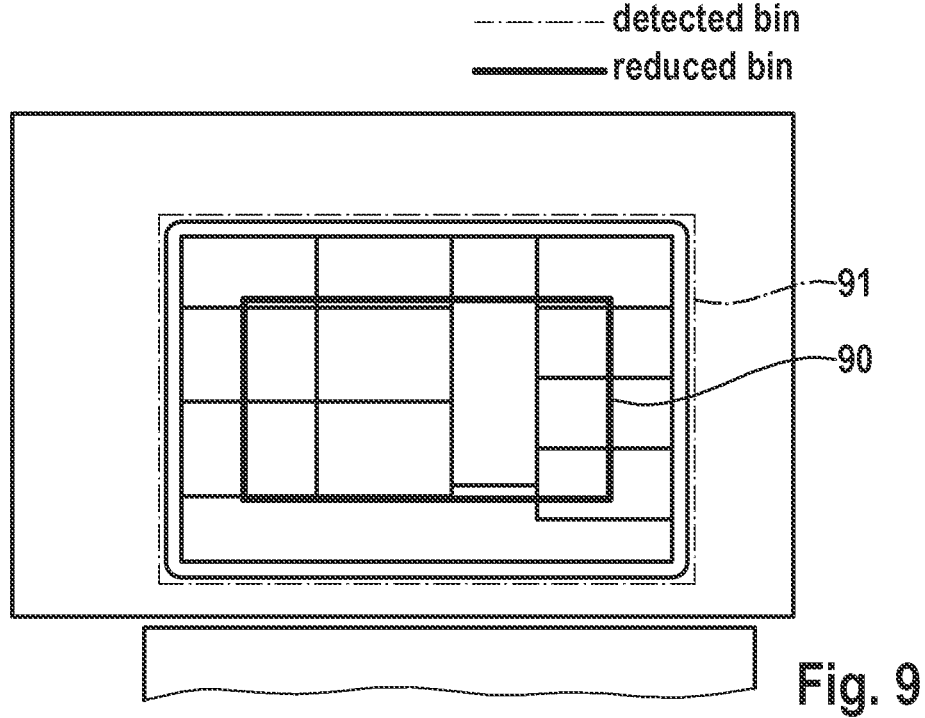
FIG. 9 is a depiction of a peripheral boundary applied to an image of a stack of stackable objects or illustrates generating a reduced area for grasp proposals, according to an example embodiment of the present invention.

FIG. 9 illustrates generating a reduced area for grasp proposals based on the position of container 23 sidewalls.

Figure 10:
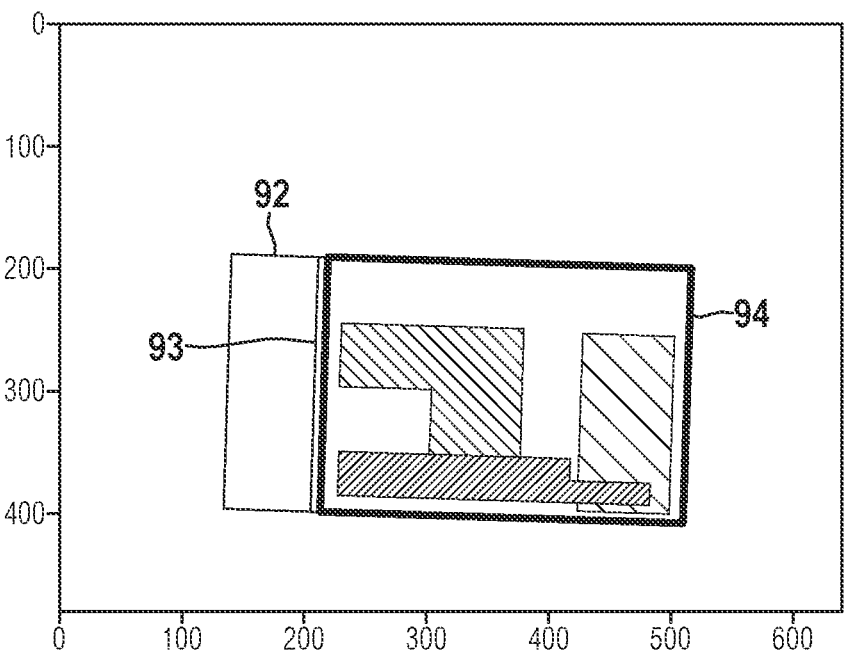
FIG. 10 shows three stack localization hypotheses on a depth map.

FIG. 10 illustrates a series of stack localization hypotheses on a depth map obtained by a depth camera 28*a* in the experimental setup illustrated in FIG. 8. Regions of lighter intensity in the depth map of FIG. 10 represent regions of the depth map that are closer to the depth camera 28*a*, and thus have a higher height in the workspace 22. In FIG. 10, a mask has been applied around container 23 to removes depth values adjacent to the workspace. A first stack localisation hypothesis 92 appears to encompass a region of the workspace that is outside of the container 23 a second stack localisation hypothesis 93 begins to converge on the stack inside the container 23. A final, and optimal stack localisation hypothesis 94 encompasses the depth map representation of the stackable objects in an efficient way.

Figure 11:
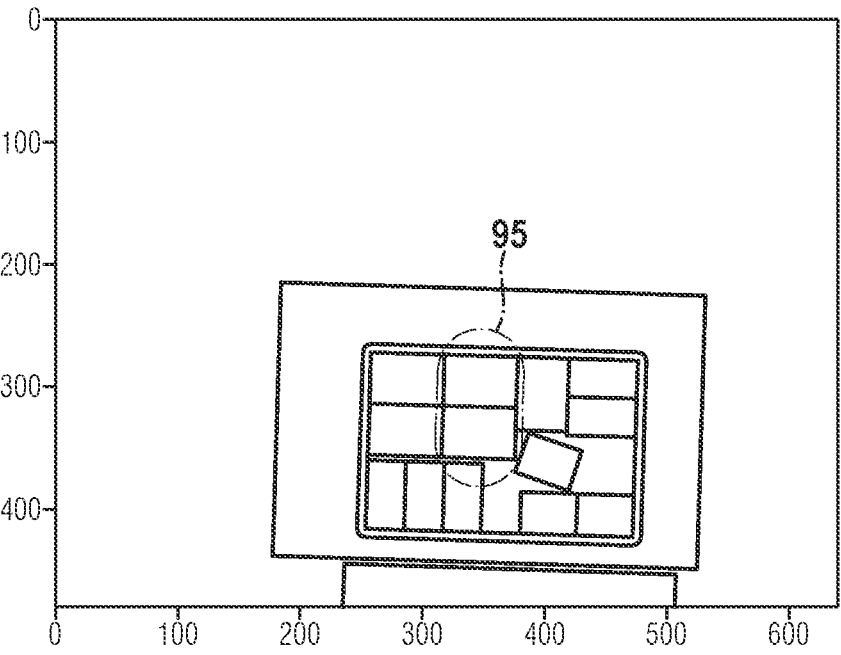
FIG. 11 shows an RGB frame before object picking or before removal of a box from a container.
Figure 12:
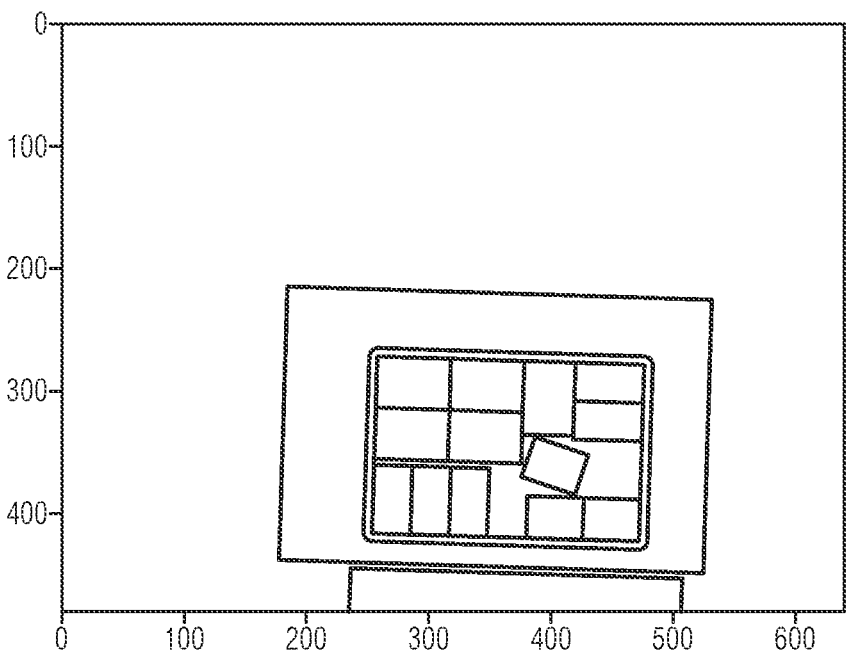
FIG. 12 shows an RGB frame after object picking or after removal of a box from a container.

FIG. 11 illustrates an experimental example of an RGB frame before removal of two boxes from a container. The circle indicated by reference numeral 95 illustrates the two boxes having a higher height value Δz. FIG. 12 illustrates an experimental example of an RGB frame after removal of the two boxes from a container.

Figure 13:
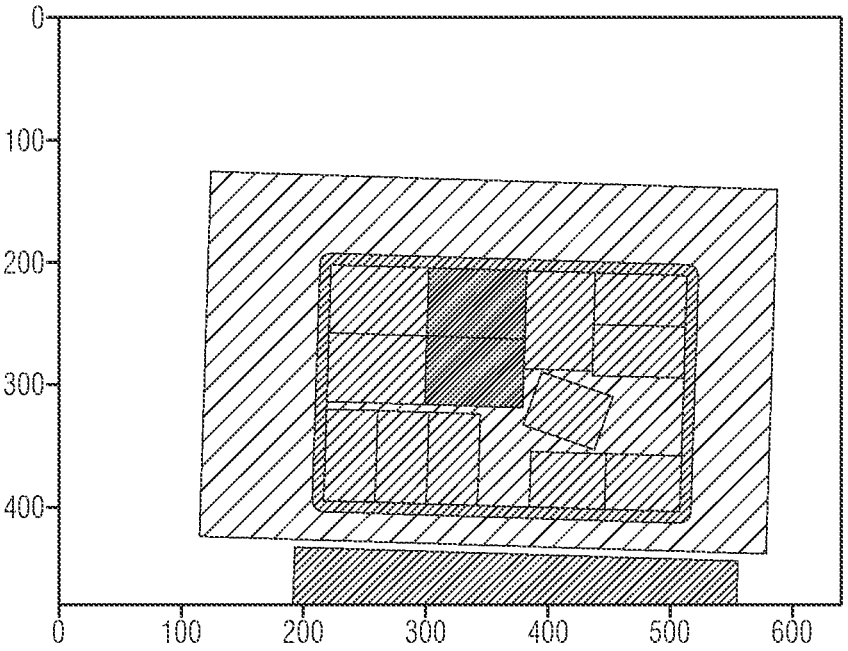
FIG. 13 shows a depth map of the frame of FIG. 8 before object picking or a depth map corresponding to the RGB image of FIG. 8.
Figure 14:
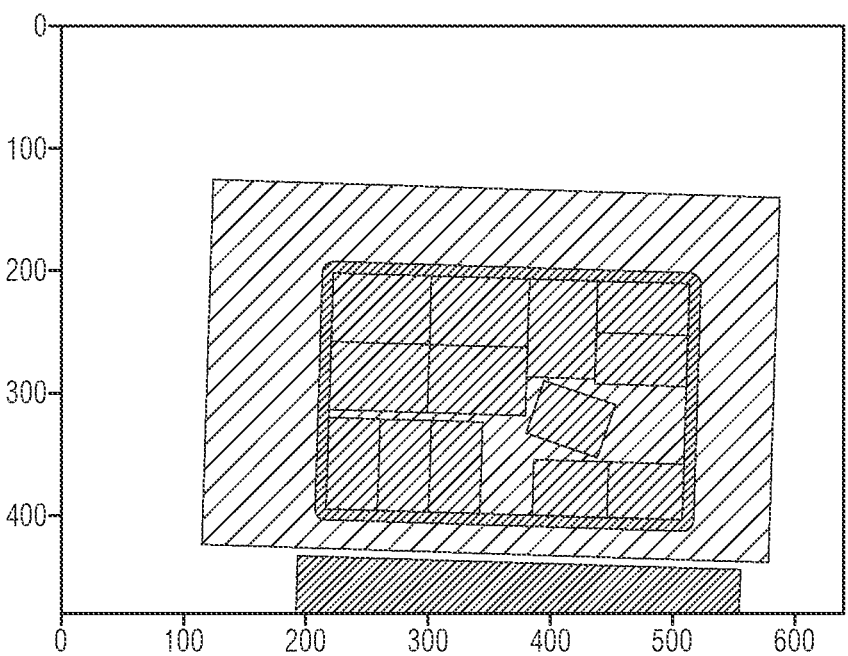
FIG. 14 shows a depth map of the frame of FIG. 9.

FIG. 14 illustrates a depth map corresponding to the RGB image of FIG. 12. FIG. 13 illustrates a depth map corresponding to the RGB image of FIG. 11. More densely hatched regions in FIG. 14 and FIG. 13 represent regions that are closer to the depth camera, or, for example, have a greater height about the workspace 22.

Figure 15:
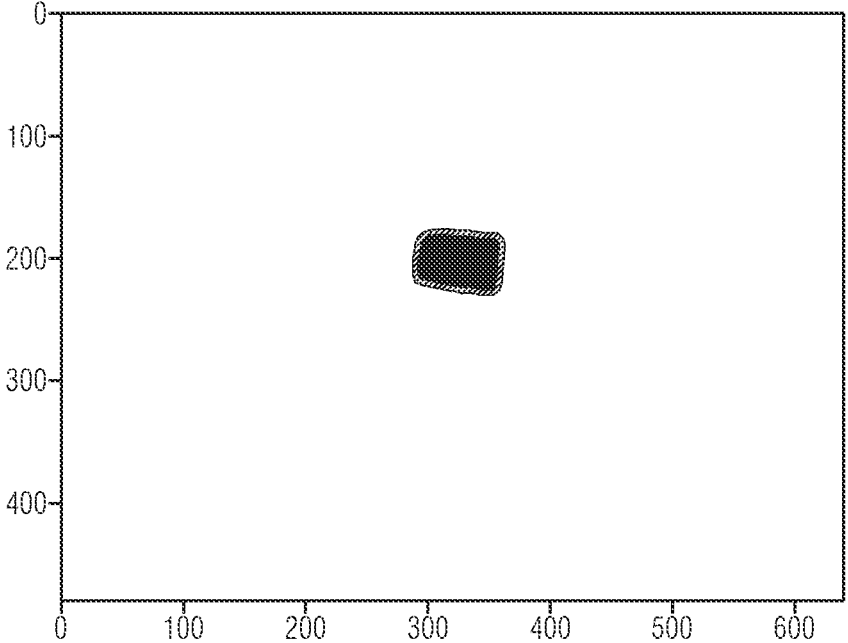
FIG. 15 shows a depth difference mask between the consecutive frames of FIGS. 10 and 11.

FIG. 15 a shows a depth difference mask between the consecutive frames of FIGS. 14 and 13.

Figure 16:
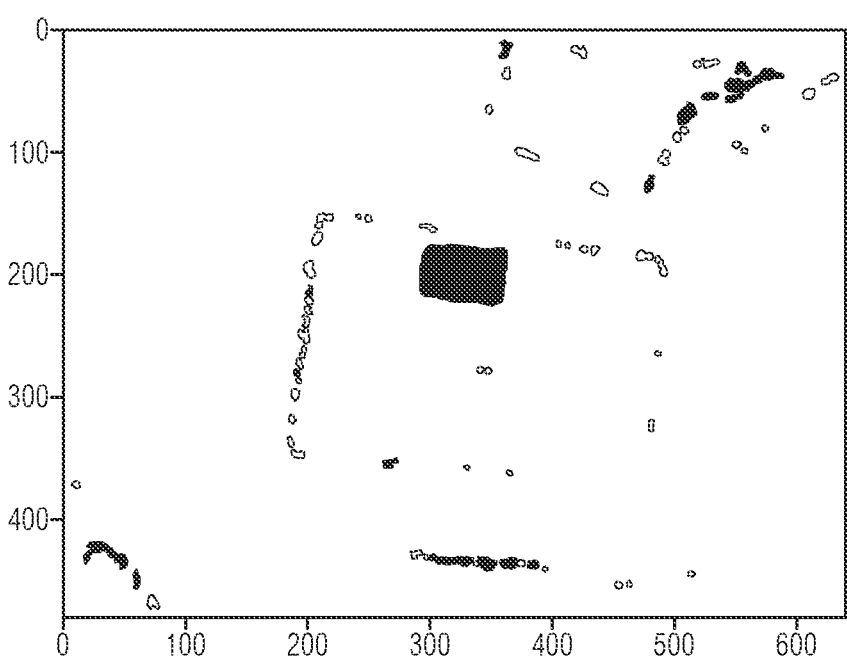
FIG. 16 shows a segmentation of a stackable object resulting from the depth difference mask of FIG. 12.

FIG. 16 shows a segmentation of a stackable object resulting from the depth difference mask of FIG. 15.

Figure 17:
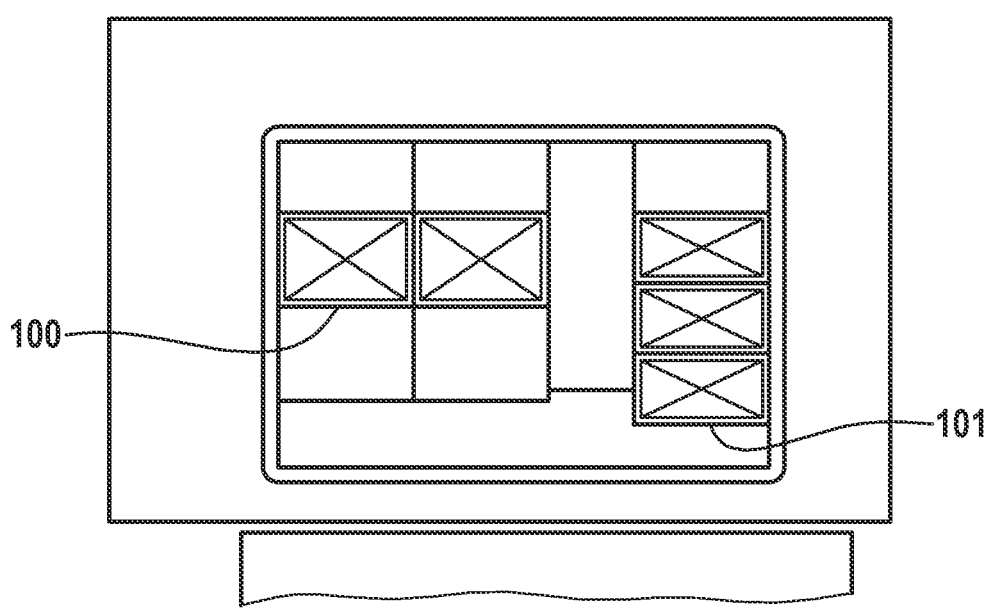
FIG. 17 illustrates a segmentation mask generated from a partial grasping sequence of five boxes.

FIG. 17 illustrates a segmentation mask generated from a partial grasping sequence of five boxes.

Figure 18:
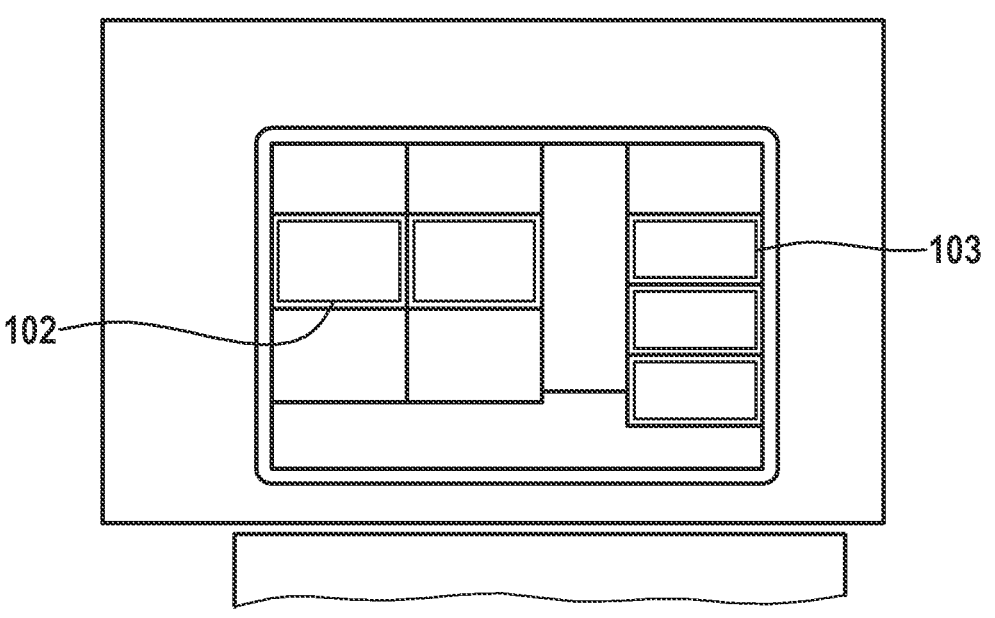
FIG. 18 illustrates detection bounding boxes for a sequence of five boxes.

FIG. 18 illustrates detection bounding boxes for a sequence of five boxes.

Figure 19:
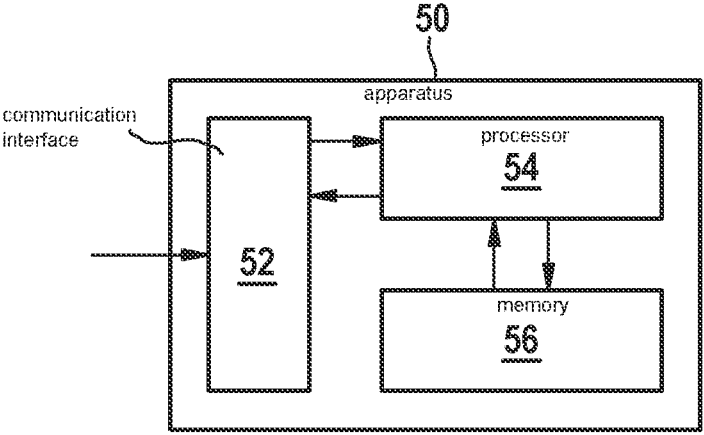
FIG. 19 schematically illustrates an apparatus according to the second aspect or an apparatus according to the seventh aspect of the present invention.

FIG. 19 schematically illustrates an apparatus according to the second aspect.

According to the second aspect, there is provided an apparatus 50 for generating labelled training images characterizing automatic robotic or manual manipulation of a plurality of stackable objects in a workspace. The apparatus comprises a communication interface 52, a processor 54, and a memory 56.

The communication interface 52 is configured to obtain a first training image subset obtained at a first time index comprising a depth map and a visual image of a plurality of stackable objects in a stacking region of a workspace optionally comprising a robotic manipulator, to obtain a second training image subset obtained at a second time index comprising a depth map and a visual image of the stacking region in the workspace, wherein the second training image subset characterizes a changed spatial state of the stacking region.

The processor 54 is configured to compute a depth difference mask based on the depth maps of the first and second training image subsets, to compute a visual difference mask based on the visual images of the first and second training image subsets, and to generate a segmentation mask using the depth difference mask and/or the visual difference mask, wherein the segmentation mask localizes a stackable object based on the spatial state of the stacking region at the first time index, before the spatial state was changed by automatic robotic or manual manipulation of the at least one stackable object in the workspace.

For example, the apparatus 50 is implemented using a personal computer, a server, an industrial computer, and embedded PC, and the like. In examples, a robotic manipulator 26, the depth camera 28*a*, and the 2D optical camera 28*b* are communicably coupled to the apparatus 50 using a communications interface 52 via a communications network 30. The communications network 30 may comprise, one or combination of modalities such as Wi-Fi™, CANBUS™, PROFIBUS™, Ethernet, and the like, enabling suitable communication with the robotic manipulator 26, the depth camera 28*a*, the 2D optical camera 28*b*, and the apparatus 50. Furthermore, the apparatus 50 can, in embodiments, be collocated with the workspace 22. In other embodiments, the apparatus 50 can be located remotely from the workspace 22. For example, analysis of the images from the depth camera 28*a*, and the 2D optical camera 28*b* can be remotely analysed at a datacentre, and movement commands for the robotic manipulator 26 can be sent from the datacentre.

Figure 20:
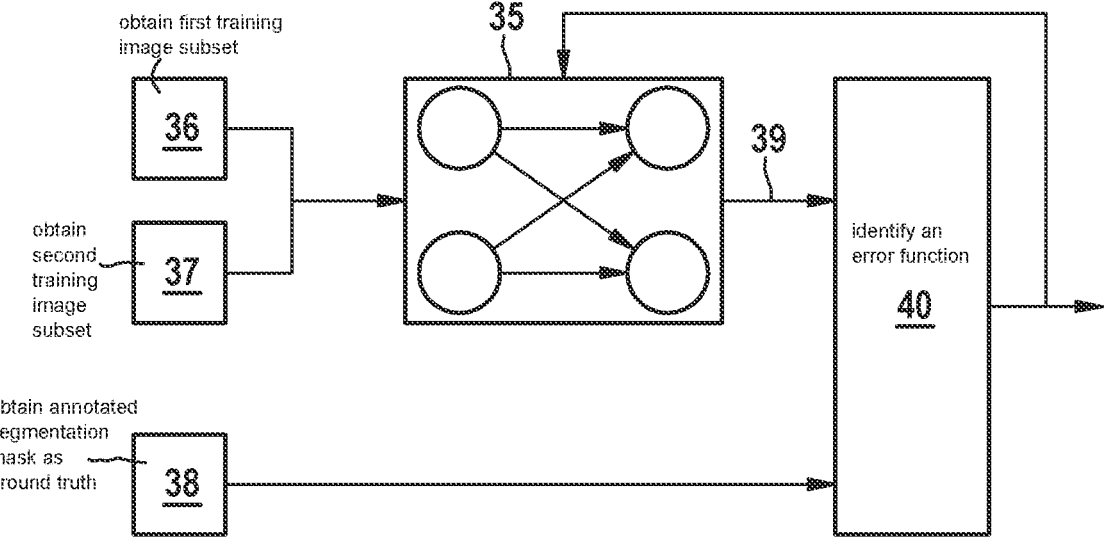
FIG. 20 schematically illustrates a method for training a machine learning model according to the third aspect of the present invention.

FIG. 20 schematically illustrates a method for training a machine learning model according to the third aspect.

According to a third aspect, there is provided a computer-implemented method for training a machine learning object segmentation model 35, comprising:

obtaining a first training image subset 36 comprising a depth map and a visual image of a plurality of stackable objects 24 in a stacking region 22*a* of a workspace 22 optionally comprising a robotic manipulator;

obtaining a second training image subset 37 comprising a depth map and a visual image of the stacking region 22*a* in the workspace 22, wherein the second training image subset characterizes a changed spatial state of the stacking region; and obtaining an annotated segmentation mask M as ground truth 38, wherein the annotated segmentation mask has been computed according to the method of the first aspect, or its embodiments, using the first training image subset 36 and the second training image subset 37;

providing the first training image subset 36 and the second training image subset 37 as inputs to a machine learning object segmentation model;

generating an automatic segmentation 39 using the machine learning object segmentation model 35;

identifying an error function 40 between the automatic segmentation and the segmentation mask; and iterating the machine learning object segmentation model 35 using the error function until a convergence criterion has been reached, to thus generate a trained machine learning object segmentation model 35; and outputting the trained machine learning object segmentation model 35.

According to a fourth aspect, there is provided a system 20 for robotically manipulating of a plurality of stackable objects 24, comprising:

a robotic manipulator 26 configured to manipulate a plurality of objects within a target space of a workspace 22 comprising at least one stacking region 22*a* for stacking a plurality of objects 24, and at least one ancillary region 22*b* for storing stackable objects;

an imaging system 28 configured to obtain a plurality of depth maps and a plurality of two-dimensional images of the at least one stacking region 22*a* of the workspace;

a controller comprising a machine vision system comprising the trained machine learning object segmentation model generated according to the third aspect; and a communications system 30 configured to communicably couple at least the robotic manipulator, the imaging system, and the controller.

According to a fifth aspect, there is provide a computer program element comprising a set of machine readable instructions which, when executed by a processor, cause a computer to perform the steps of the computer-implemented method according to one of the first or third aspects.

The examples provided in the figures and described in the foregoing written description are intended for providing an understanding of the principles of the present invention. No limitation to the scope of the present invention is intended thereby. The present specification describes alterations and modifications to the illustrated examples. Only the preferred examples have been presented, and all changes, modifications and further applications to these within the scope of the specification are desired to be protected.

The techniques according to the sixth to ninth aspects will be discussed in more detail subsequently.

The method according to the sixth aspect comprises obtaining 13 an initial depth map of a plurality of stackable objects 24 together comprising a stack in the stacking region 22a. In an embodiment, the initial depth map is registered from the coordinate system of the camera 28a to the coordinate system of the workspace (in FIG. 2, the coordinate system of the workspace is also the coordinate system of the robot xr, yr, zr). This may comprise, for example, obtaining a height $\Delta z$ each stackable object 24a, 24b visible in the field of view of the depth camera 28a.

According to an embodiment, the method further comprises obtaining a height of the stacking region 22a either using the depth camera 28a of the imaging system, or by user input via a user interface.

According to an embodiment, the method further comprises converting the initial depth map of the workspace 22 into a point cloud representation of the workspace 22.

FIG. 9 illustrates generating a reduced area for grasp proposals based on the position of container 23 sidewalls.

According to an embodiment, the method further comprises: detecting, in the initial depth map, at least one container side-wall 23 in the stacking region 22a, and removing, from a configuration space of the robotic manipulator, a portion of an exclusion region 90, 91 of the stacking region 22a partially defined by the at least one container side-wall, so that the grasping proposal P1 does not require the robotic manipulator to move a stackable object 24 within the exclusion region 80, 81.

One purpose of generating a container sidewall offset is to prevent a robotic manipulator 26 colliding with the side of a container 23 during a stacking operation. Furthermore, grasping proposals that contain grasping attempts on the container can be prevented. As shown in FIG. 9, in the case of a rectangular container 23, a detected boundary 91 of the container is reduced to a reduced boundary of the container 90. In practice, the container sidewall offset is implemented as a restriction of the configuration space that the robotic manipulator may plan grasping attempts within, for example. The container sidewall offset can vary arbitrarily with height $\Delta z$, to take account of the geometry of the container 23 and/or the stackable objects 24 as the robotic dinner plate 26 reaches more deeply into the container 23.

In an example, container 23 side-walls can be identified in the depth map (or point cloud representation) obtained by the depth camera 28a by localising linear features having a relatively high height in the workspace forming a path around the stackable objects 24 that are thinner than the expected widths of the stackable objects 24.

According to an embodiment, the method further comprises computing at least one stack location hypothesis 92, 93, 94 using the initial depth map, wherein the at least one stack location hypothesis 92, 93, 94 defines a region of the stacking region 22a containing the stack. During stack localisation, the depth map (and/or the associated point cloud representation) is analysed to identify objects above the floor of the workspace 22. One or more hypotheses is generated, and the optimal hypothesis is selected. The outcome of the stack localisation procedure affects the series of grasping proposals. In the case of depalletizing, a grasping proposal should unload a pallet from the top of the pallet to the bottom of the pallet. Within this requirement, there may be various grasping strategies (for example, stackable objects on each layer of the pallet may be grasped from the back of the pallet moving forward, or alternatively from the front of the pallet moving backwards, or in another alternative in a random pattern per layer. Therefore, the accurate localisation of stacks of boxes within the depth map determines the effectiveness of the grasping strategy.

FIG. 10 illustrates a series of stack localization hypotheses on a depth map obtained by a depth camera 28a in the experimental setup illustrated in FIG. 8. More densely hatched regions in the depth map of FIG. 10 represent regions of the depth map that are closer to the depth camera 28a, and thus have a higher height in the workspace 22. A first stack localisation hypothesis 92 appears to encompass a region of the workspace that is outside of the container 23 a second stack localisation hypothesis 93 begins to converge on the stack inside the container 23. A final, and optimal stack localisation hypothesis 94 encompasses the depth map representation of the stackable objects in an efficient way.

According to an embodiment, the grasping proposal P1 is generated by sampling the point cloud representation of the workspace 22 (initial depth map) using the dimension and/or shape attribute data of the stackable objects 24, and designating at least one region in the point cloud representation and/or the initial depth map as a prospective grasping proposal P1, wherein the position of the prospective grasping proposal P1 is correlated with the position of a stackable object 24 in the workspace 22. A grasping proposal is represented as a data structure in, for example, a database providing the identity of a region in, for example, XYZ coordinates of the workspace that a robotic manipulator 26 should attempt to remove. The grasping proposal P1-P3 can comprise a data structure that references prior, and subsequent grasping locations in the workspace. The one or more grasping proposals can be automatically compiled into machine instructions for controlling the end effector of a robotic manipulator 26.

In an example, the grasping proposals P1-P3 are generated by performing a sparse sample of the XYZ points of the workspace defined in the point cloud representation of the workspace 22. In an embodiment, the grasping proposals are organised in a grid-like manner, spaced according to the dimension attribute data of a type of object of a stackable object 24.

In an embodiment, the grasping proposals P1-P3 provide proposals for grasping stackable objects 24 that are visible to the depth camera 28a. Accordingly, in an embodiment grasping proposals are reformulated each time a stackable object is removed, or added to, the workspace 22.

According to an embodiment, if a plurality of prospective grasping proposals P1-P3 are designated, computing a priority ranking of the prospective grasping proposals P1-P3 based on the height of a corresponding stackable object 24 in the workspace 22 as represented in the point cloud representation of the workspace 22, and providing, as the grasping proposal P1, the prospective grasping proposal P1 having the highest priority.

According to an embodiment, the grasping proposal P1 having the highest priority is the grasping proposal P1 targeting a stackable object 24a at the highest height Δz. The next-ranked grasping proposal P2 targets a stackable object 24b at the next highest height. In an embodiment, a grasping proposal for stackable object 24c is not generated until the removal of stackable object 24a, because stackable object 24a includes stackable object 24c in the depth map. In another embodiment, inference logic may be applied based on the shape attribute data of the stackable objects 24 to generate a grasping proposal P3 for stackable objects 24c that are occluded in the depth map.

Once generated, each grasping proposal is compiled into a sequence of motion instructions for moving the robotic manipulator 26 and actuating the end effector 27, to thus grasp a relevant stackable object 24 referenced by the grasping proposal.

A first image subset 30 of the stacking region 22a is obtained using an imaging system comprising a depth camera 28a and a visual camera 28b, wherein the first image subset 30 comprises at least one depth map D1 and at least one 2D image RGB1 of the stacking region 22a.

A stackable object 24 is moved out of, or into, a location in the stacking region 22a using the robotic manipulator 26 according to the grasping proposal P1, and the associated sequence of motion instructions, to thus change the spatial state of the stacking region 22a.

A second image subset of the stacking region 22a is obtained using the imaging system, wherein the second image subset also comprises at least one depth map and at least one 2D image of the stacking region 22a in the changed spatial state.

According to an embodiment, the first image subset 30 and the second image subset 32 are output as a pair of difference images of the workspace 22 useful as training data to be input into a training process of a machine learning object segmentation model.

The method according to the sixth aspect is applied iteratively according to the calculated grasping proposal. FIG. 5 schematically illustrates side views of generating first 30 and second 32 image subsets from a container comprising a stack of stackable objects having two levels, two stackable objects in the x direction, and one stackable object in the y direction, for a total of four stackable objects. Such a container 23 can be unpacked using a grasping proposal having five stages of a robotic container unpacking process, for example. (For clarity, the robotic manipulator 26 is not shown). Stackable objects occurring at the lower layer of the container are hatched to represent the depth difference. The depth maps D1-D5 and the visual images RGB 1-5 are obtained by a camera 28 that is substantially positioned over the container 23. The camera 28 in FIG. 5 images the stacking region 23a of the workspace 22, and also the ancillary region 22b, but this is not essential.

Therefore, the sequence of depth maps D1-D5 and the visual images RGB 1-5 represent image frames comprising differences of the spatial configuration of the stacking region 23a and/or the ancillary region 22b is a spatial configuration involves according to a grasping sequence implemented by a robotic manipulator 26 according to a grasping proposal.

The respective pairs of depth maps D1-D2, D2-D3, D3-D4, D4-D5 can each be used as input data to a training process of a depth-based machine learning segmentation model. Furthermore, the respective pairs of visual images RGB1-RGB2, RGB2-RGB3, RGB3-RGB4, RGB4-RGB5 synchronised in time, and registered in space, to the depth maps can each be used as supplemental input data to a training process of a depth-based machine learning segmentation model. The respective pairs of depth maps and/or visual images are acquired without user intervention. Although the acquisition of images at discrete time points has been mentioned, a skilled person will appreciate that the depth and/or visual images can be acquired by a continuously running video camera (including a video depth camera) in a continuous acquisition run. In this case, acquiring the respective pairs of depth maps and visual images are obtained from the depth video and visual video at sampling instances derived from the grasping proposal or instructions for the robotic manipulator 26, for example.

FIG. 11 illustrates an experimental example of an RGB frame before removal of two boxes from a container. FIG. 12 illustrates an experimental example of an RGB frame after removal of the two boxes from a container. The circle indicated by reference numeral 95 illustrates the two boxes having a higher height value Δz.

FIG. 14 illustrates a depth map corresponding to the RGB image of FIG. 12. FIG. 13 illustrates a depth map corresponding to the RGB image of FIG. 11. More densely hatched regions in FIG. 14 and FIG. 13 represent regions that are closer to the depth camera, or, for example, have a greater height about the workspace 22.

According to an embodiment, providing the grasping proposal further comprises comparing, by image processing, the prospective grasping proposals P1-P3 to a buffer of grasping failures F1-F3. If a prospective grasping proposal resembles a grasping failure F1-F3, the prospective grasping proposal is removed from the plurality of prospective grasping proposals P1-P3.

An example of a grasping failure is that no box was removed during the grasp attempt.

According to an embodiment, the at least one depth map and/or the at least one 2D image of the stacking region 22a comprised in the second image subset is analysed, a grasping failure is identified, and the second image subset is automatically labelled as representative of a grasping failure, and/or adding the second image subset to the buffer of grasping failures F1-F3. By labelling obtained set of first and second image subsets as representative of a grasping failure, a subsequent training process using the first and second image subsets can train a machine learning to identify grasping failures.

According to an embodiment, a grasping failure is a detected failure to correctly move the stackable object, and/or to induce a parasitic motion in other stackable objects 24 in the workspace 22.

According to an embodiment, the method comprises identifying that the spatial state of the stacking region 22a has reached a stopping condition, wherein the stopping condition is optionally that the workspace 22 is empty, or full, of stackable objects 24, and outputting the first 30 and second image subsets 32. Specifically, an example of the stopping condition is that the depth map obtained by the depth camera 28a corresponds, for the entire region of the container floor, to the depth of the workspace 22 floor (within a given tolerance that is lower than the height of the stackable objects 24). This is an indication that the container 23 has been fully emptied by the robotic manipulator 26.

Following completion of the dataset collection of the plurality of image subsets, the data comprising a plurality of image subsets is transmitted to a further processor perform a training process of a machine learning model for object segmentation. In another embodiment, the data comprising the plurality of image subsets is stored in a server, or on a computer readable medium, so that it can be input to a training process at a subsequent time.

FIG. 4 schematically illustrates the method according to a more detailed example. An initialisation process 61 comprises obtaining 62 dimension attribute data of workspace 22. The initialisation process 61 further comprises obtaining 63 dimensional and/or shape attribute data of at least of the plurality of stackable objects. The initialisation process 60 further comprises obtaining 64 an initial depth map of a plurality of stackable objects 24. Following the initialisation process 61, the floor height is estimated 65 using the initial depth map and, for example, dimension attribute data of the workspace 22 and attribute data of the types and/or dimensions of objects within the plurality of stackable objects.

A plurality of stack localisation hypotheses H1-H3 are generated 66, and the presence of sidewalls is offset by defining a peripheral exclusion zone to prevent grasping attempts on a container 23 if present. A plurality of grasping proposals P1-P3 are generated 68 using, for example, a sparse sample of XYZ using the dimension attribute data of the plurality of stackable objects.

The proposals are sorted at step 69 using information from a buffer 77 of previous grasping failures F1-F3 so that the method checks, at step 70, that a grasping proposal will not result in a failed grasping attempt. If the grasping proposal will result in a failed grasping attempt ("Y" of decision box 70) then the next highest priority grasping proposal is obtained. If the grasping proposal will not result in a failed grasping attempt ("N" of decision box 70) program flow continues.

At step 71, the imaging system acquires a first image subset comprising at least one depth map and at least one visual image of the stacking region 22*a*. At step 72, a robotic grasp is executed using the robotic manipulator 26 according to the grasp proposal P1. Once the grasp has been completed, a second image subset of the stacking region 22*a* is acquired comprising at least one depth map and at least one visual image of the stacking region 22*a* depicting the change in spatial state of the stacking region caused by the grasping activity of the robotic manipulator 26.

Not all failure cases F1-F3 may be contained in the failure buffer 77. If the implementation of the robotic grasp at step 72 results in a new grasp failure, this should be saved in the failure buffer 77 to inform subsequent grasp proposal generation routines. Accordingly, step 74 detects whether the grasp implemented at step 72 has succeeded based on an analysis of the images of the second image subset. If the grasp the precursor first image subset obtained at step 71 is added to the failure buffer 77.

Then, an analysis step 78 judges whether the grasp failure critically prevents the grasping process from continuing, in which case the program that exits with an error condition 79. The analysis step 78 may judge whether, or not, the grasp failure critically prevents further grasping activity based on, for example, predictable restrictions of motion freedom of the robotic manipulator 26 in the workspace 22, as compared to the plurality of grasping proposals. If the grasp failure is recoverable, the program continues to resort the grasping proposals P1-P3 using information of the new failure condition.

Returning to step 74, if the grasp execution at 72 is judged to be successful based on an analysis of the second image subset obtained at 73, a further check is performed at 75 as to whether, or not, stopping condition of the grasping procedure has been reached. If the stopping condition has not been reached, the grasping proposal is incremented at step 80 and the grasp execution step 72 is repeated using the new grasping proposal P+1. If the stopping condition has been met, for example because the stacking portion of the workspace has been fully cleared of stackable objects and the height detected by the depth camera 28*a* in the stacking portion 22*a* of the workspace resembles the height of the workspace 22, the program flow moves to the end condition 76.

FIG. 17 illustrates an example of segmentation from a partial grasping sequence. Segmentation masks generated from the first and second image subsets are indicated using reference numerals 100 and 101.

FIG. 18 illustrates an example of box detection bounding boxes from a partial grasping sequence of a grasping proposal. Box detection bounding boxes are illustrated using reference numerals 102 and 103.

FIG. 19 schematically illustrates an apparatus according to the seventh aspect.

According to a seventh aspect, there is provided an apparatus 50 for autonomously generating a set of images characterizing a robotic manipulation of a plurality of stackable objects 24, comprising a communication interface 52 configured to communicate with at least a robotic manipulator 26 and an imaging system 28, a processor 54, and a memory 56.

The processor 54 is configured to obtain dimension attribute data of a workspace 22 in a coordinate system of the robotic manipulator 26, to obtain dimension and/or shape attribute data of at least one type of object of the plurality of stackable objects 24, to obtain a first image set of a stacking region 22*a* using an imaging system comprising a depth camera 28*a* and a visual camera 28*b*, wherein the first image subset comprises at least one depth map and at least one 2D image of the stacking region 22*a*, to move a stackable object 24 out of, or into, a location in the stacking region 22*a* using the robotic manipulator 26 according to a grasping proposal P1) to thus change the spatial state of the stacking region 22*a*, to obtain a second image subset of the stacking region using the imaging system 28, wherein the second image subset also comprises at least one depth map and at least one 2D image of the stacking region 22*a* in the changed spatial state, and to output the first and second image subsets.

For example, the apparatus 50 is implemented using a personal computer, a server, an industrial computer, and embedded PC, and the like. A robotic manipulator 26, the depth camera 28*a*, and the 2D optical camera 28*b* are communicably coupled to an apparatus 50 using a communications interface 52 via a communications network 30. The communications network 30 may comprise, one or combination of modalities such as Wi-Fi™, CANBUS™, PROFIBUS™, Ethernet, and the like, enabling suitable communication with the robotic manipulator 26, the depth camera 28*a*, the 2D optical camera 28*b*, and the apparatus 50. Furthermore, the apparatus 50 can, in embodiments, be collocated with the workspace 22. In other embodiments, the apparatus 50 can be located remotely from the workspace 22. For example, analysis of the images from the depth camera 28*a*, and the 2D optical camera 28*b* can be remotely analysed at a datacentre, and movement commands for the robotic manipulator 26 can be sent from the datacentre.

According to an eighth aspect, there is provided a system 20 for autonomously generating a set of images characterizing a robotic manipulation of a plurality of stackable objects 24. The system comprises:

a robotic manipulator 26 configured to manipulate a plurality of objects within a target space of a workspace 22 comprising at least one stacking region 22a for stacking a plurality of objects 24, and at least one ancillary region 22b for storing stackable objects;

an imaging system 28 configured to obtain a plurality of depth maps and a plurality of two-dimensional images of the at least one stacking region 22a of the workspace;

an apparatus 50 according to the seventh aspect, or its embodiments, and a communications system 30 configured to communicably couple at least the robotic manipulator 26, the imaging system 28, and the apparatus 50.

According to a ninth aspect, there is provided a computer program element comprising a set of machine readable instructions which, when executed by a processor, cause a computer to perform the steps of the computer-implemented method according to the sixth aspect, or its embodiments.

According to a tenth aspect, there is provided a computer readable medium comprising a set of machine readable instructions which, when executed by a processor, cause a computer to perform the steps of the computer-implemented method according to the sixth aspect, or its embodiments.

According to an eleventh aspect, there is provided a computer readable medium comprising a first image subset and a second image subset generated according to the computer-implemented method of the sixth aspect, or its embodiments.

According to a twelfth aspect, there is provided a computer-implemented method for training an object segmentation model using machine learning, wherein the machine learning model is trained using annotated data generated from the first image subset and the second image subset, wherein the first image subset and the second image subset are generated according to the computer-implemented method of the sixth aspect, or its embodiments.

The examples provided in the figures and described in the foregoing written description are intended for providing an understanding of the principles of the present invention. No limitation to the scope of the present is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method for generating labelled training images characterizing automatic robotic or manual manipulation of a plurality of stackable objects in a workspace, comprising the following steps:

obtaining a first training image subset obtained at a first time index including a depth map and a visual image of a plurality of stackable objects in a stacking region of a workspace;

obtaining a second training image subset obtained at a second time index including a depth map and a visual image of the stacking region in the workspace, wherein the second training image subset characterizes a changed spatial state of the stacking region;

computing a depth difference mask based on the depth maps of the first and second training image subsets;

computing a visual difference mask based on the visual images of the first and second training image subsets; and generating an annotated segmentation mask using the depth difference mask and/or the visual difference mask, wherein the annotated segmentation mask localizes a stackable object based on a spatial state of the stacking region at the first time index, before the spatial state was changed by automatic robotic or manual manipulation of at least one stackable object in the workspace.

2. The computer-implemented method according to claim 1, wherein the workspace includes a robotic manipulator.

3. The computer-implemented method according to claim 1, further comprising:

labelling the stackable object in either the first or the second training image subset using the annotated segmentation mask.

4. The computer-implemented method according to claim 1, wherein the changed spatial state characterized by the second training image subset compared to the first training image subset is caused by a robotic manipulator or manual manipulation: i) removing a stackable object from the stacking region, or ii) adding a stackable object to the stacking region.

5. The computer-implemented method according to claim 1, further comprising the following steps:

obtaining a depth range of the stacking region in the workspace; and masking the depth map of the first training image subset and the depth map of the second training image subset based on the obtained depth range.

6. The computer-implemented method according to claim 1, further comprising the following steps:

for a plurality of further training image subsets:

computing a plurality of further depth difference masks based on depth maps of the further training image subsets;

computing a plurality of further visual difference masks based on visual images of the further training image subsets; and generating a plurality of further segmentation masks using corresponding time-indexed pairs of the further depth difference masks and further visual difference masks;

wherein each of the plurality of further segmentation masks characterizes a further spatial state of the stacking region at an incremented time index, before the spatial state was changed by automatic robotic or manual manipulation of a further plurality of stackable objects in the workspace.

7. The computer-implemented method according to claim 6, further comprising:

generating a full frame annotation of all objects visible in the depth map and/or the visual image of the first training image subset.

8. The computer-implemented method according to claim 1, further comprising the following steps:

comparing a stackable object in a current depth map or current visual image with a corresponding stackable object in at least one previous depth map or previous visual image;

based on the comparison, identifying that an object has been moved parasitically; and marking at least one segmentation mask based on the current depth map or current visual image with an inconsistency warning.

9. The computer-implemented method according to claim 8, further comprising:

generating at least one corrected segmentation mask by compensating the object that has been moved parasitically in the at least one segmentation mask marked as inconsistent, wherein the compensation is applied using one of optical flow, or sparse feature matching, or template matching.

10. The computer-implemented method according to claim 1, wherein the first and second training image subsets are subsets of a set of images characterizing the robotic manipulation of at least one stackable object and the obtaining of the first training image subset and the obtaining of the second training image subset comprise autonomously generating the set of images by performing the following steps:

obtaining dimension attribute data of a workspace in a coordinate system of a robotic manipulator;

obtaining dimension and/or shape attribute data of at least one type of object of the plurality of stackable objects;

obtaining an initial depth map of a plurality of stackable objects together including a stack in the stacking region;

generating a grasping proposal using the initial depth map;

obtaining the first image subset of the stacking region using an imaging system including a depth camera and a visual camera, wherein the first image subset includes at least one depth map and at least one visual image of the stacking region;

moving a stackable object out of, or into, a location in the stacking region using the robotic manipulator according to the grasping proposal, to thus change a spatial state of the stacking region; and obtaining the second image subset of the stacking region using the imaging system, wherein the second image subset also includes at least one depth map and at least one 2D image of the stacking region in the changed spatial state.

11. The computer-implemented method according to claim 10, wherein:

the autonomous generation of the set of images further comprises converting the initial depth map of the workspace into a point cloud representation of the workspace; and the grasping proposal is generated by:

sampling the point cloud representation of the workspace using the dimension and/or shape attribute data of the stackable objects; and designating at least one region in the point cloud representation and/or the initial depth map as a prospective grasping proposal, wherein a position of the prospective grasping proposal is correlated with the position of a stackable object in the workspace.

12. An apparatus configured to generate labelled training images characterizing automatic robotic or manual manipulation of a plurality of stackable objects in a workspace, comprising:

a communication interface;

a processor, and a memory;

wherein the communication interface is configured to obtain a first training image subset obtained at a first time index including a depth map and a visual image of a plurality of stackable objects in a stacking region of a workspace, and to obtain a second training image subset obtained at a second time index including a depth map and a visual image of the stacking region in the workspace, wherein the second training image subset characterizes a changed spatial state of the stacking region; and wherein the processor is configured to compute a depth difference mask based on the depth maps of the first and second training image subsets, to compute a visual difference mask based on the visual images of the first and second training image subsets, and to generate a segmentation mask using the depth difference mask and/or the visual difference mask, wherein the segmentation mask localizes a stackable object based on the spatial state of the stacking region at the first time index, before the spatial state was changed by automatic robotic or manual manipulation of at least one stackable object in the workspace.

13. The apparatus according to claim 12, wherein:

the communication interface configured to communicate with at least a robotic manipulator and an imaging system that includes a depth camera and a visual camera;

the first and second training image subsets are subsets of a set of images characterizing a robotic manipulation of the plurality of stackable objects;

the processor is configured to obtain the first and second training image subsets includes autonomously generating the set of images by performing the following steps:

obtaining dimension attribute data of a workspace in a coordinate system of the robotic manipulator;

obtaining dimension and/or shape attribute data of at least one type of object of the plurality of stackable objects;

obtaining, with the imaging system, a first image subset of the stacking region that includes at least one depth map and at least one 2D image of the stacking region;

moving a stackable object out of, or into, a location in the stacking region using the robotic manipulator according to a grasping proposal to change a spatial state of the stacking region;

obtaining, with the imaging system, a second image subset of the stacking region that includes at least one depth map and at least one 2D image of the stacking region in the changed spatial state; and outputting the first and second image subsets.

14. A non-transitory machine-readable medium on which is stored a computer program including a set of machine readable instructions for generating labelled training images characterizing automatic robotic or manual manipulation of a plurality of stackable objects in a workspace, the instructions, when executed by a computer, causing the computer to perform the following steps:

obtaining a first training image subset obtained at a first time index including a depth map and a visual image of a plurality of stackable objects in a stacking region of a workspace;

obtaining a second training image subset obtained at a second time index including a depth map and a visual image of the stacking region in the workspace, wherein the second training image subset characterizes a changed spatial state of the stacking region;

computing a depth difference mask based on the depth maps of the first and second training image subsets;

computing a visual difference mask based on the visual images of the first and second training image subsets;

generating an annotated segmentation mask using the depth difference mask and/or the visual difference mask, wherein the annotated segmentation mask localizes a stackable object based on a spatial state of the stacking region at the first time index, before the spatial state was changed by automatic robotic or manual manipulation of at least one stackable object in the workspace.

* * * * *